(12) United States Patent
Han et al.

(10) Patent No.: US 10,679,569 B2
(45) Date of Patent: *Jun. 9, 2020

(54) DISPLAY DEVICE AND METHOD OF CONTROLLING THE SAME

(71) Applicant: Samsung Electronics Co., Ltd., Suwon-si, Gyeonggi-do (KR)

(72) Inventors: Seung-Hoon Han, Suwon-si (KR); Gui Won Seo, Suwon-si (KR); Sang Wook Lee, Seoul (KR); Chang Won Kim, Gwangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,111

(22) Filed: Sep. 27, 2018

(65) Prior Publication Data

US 2019/0027100 A1 Jan. 24, 2019

Related U.S. Application Data

(63) Continuation of application No. 14/875,869, filed on Oct. 6, 2015, now Pat. No. 10,089,936.

(30) Foreign Application Priority Data

Oct. 6, 2014 (KR) .................. 10-2014-0134135
Feb. 17, 2015 (KR) .................. 10-2015-0024271

(51) Int. Cl.
*G06K 9/00* (2006.01)
*G09G 3/34* (2006.01)
(Continued)

(52) U.S. Cl.
CPC .......... *G09G 3/3413* (2013.01); *G09G 3/3607* (2013.01); *G09G 5/003* (2013.01);
(Continued)

(58) Field of Classification Search
CPC .............. G09G 3/3413; G09G 3/3607; G09G 2320/0233; G09G 2320/064;
(Continued)

(56) References Cited

U.S. PATENT DOCUMENTS 5,724,456 A * 3/1998 Boyack .................. G06T 5/009
345/428
2004/0001165 A1 * 1/2004 Shiota .................... G06T 5/009
348/678

(Continued)

FOREIGN PATENT DOCUMENTS

EP 2 819 414 A2 12/2014
EP 2 819 414 A3 2/2015
(Continued)

OTHER PUBLICATIONS

International Search Report dated Feb. 25, 2016 in corresponding International Patent Application No. PCT/KR2015/010387.

(Continued)

*Primary Examiner* — Sean T Motsinger
(74) *Attorney, Agent, or Firm* — Staas & Halsey LLP

(57) ABSTRACT

A display device, including a content receiving unit configured to receive a high dynamic range image, an image processing unit configured to detect a first region whose luminance value is equal to or greater than a reference luminance value within the high dynamic range image and perform tone mapping on an image of the first region based on feature information of the image of the first region, and a display unit configured to display a low dynamic range image on which the tone mapping is performed.

20 Claims, 43 Drawing Sheets

(51) Int. Cl.
*G09G 5/00* (2006.01)
*G09G 3/36* (2006.01)
(52) U.S. Cl.
CPC ............... *G09G 2320/0233* (2013.01); *G09G 2320/064* (2013.01); *G09G 2320/0666* (2013.01); *G09G 2320/0673* (2013.01); *G09G 2340/0428* (2013.01); *G09G 2340/06* (2013.01); *G09G 2360/16* (2013.01)
(58) Field of Classification Search
CPC ... G09G 2320/0666; G09G 2320/0673; G09G 5/003; G09G 2360/16; G09G 2340/0428; G09G 2340/06
See application file for complete search history.

(56) References Cited

U.S. PATENT DOCUMENTS

| | | | |
|---|---|---|---|
| 2004/0096103 A1* | 5/2004 | Gallagher | G06T 5/004 382/167 |
| 2005/0046902 A1* | 3/2005 | Sugimoto | G06T 5/009 358/3.01 |
| 2005/0117799 A1 | 6/2005 | Fuh et al. | |
| 2007/0070214 A1* | 3/2007 | Nakamura | G06K 9/00221 348/222.1 |
| 2008/0159646 A1* | 7/2008 | Katagiri | H04N 5/20 382/266 |
| 2008/0297460 A1 | 12/2008 | Peng et al. | |
| 2009/0161953 A1* | 6/2009 | Ciurea | H04N 1/4074 382/172 |
| 2010/0002145 A1* | 1/2010 | Spence | G06T 5/009 348/576 |
| 2010/0157078 A1 | 6/2010 | Atanassov et al. | |
| 2011/0123133 A1* | 5/2011 | Mohanty | G06T 5/009 382/274 |
| 2012/0038800 A1* | 2/2012 | Jang | H04N 1/4092 348/252 |
| 2012/0170843 A1 | 7/2012 | Lin | |
| 2013/0114912 A1* | 5/2013 | Schirris | G06T 5/00 382/274 |
| 2014/0092012 A1 | 4/2014 | Seshadrinathan et al. | |
| 2015/0003749 A1* | 1/2015 | Kim | H04N 19/463 382/232 |
| 2015/0254822 A1* | 9/2015 | Levy | G06T 5/009 382/264 |
| 2016/0104438 A1* | 4/2016 | Han | G09G 3/3413 345/690 |
| 2016/0189409 A1* | 6/2016 | Aiba | G09G 5/14 345/629 |
| 2016/0210730 A1* | 7/2016 | Eto | G06F 3/14 |
| 2016/0248939 A1* | 8/2016 | Thurston, III | H04N 1/603 |
| 2016/0275660 A1* | 9/2016 | Yamamoto | G06T 5/40 |
| 2016/0286241 A1* | 9/2016 | Ridge | H04N 19/186 |
| 2016/0364848 A1* | 12/2016 | Douady-Pleven | G06T 3/4015 |
| 2017/0025074 A1* | 1/2017 | Farrell | G06K 9/00711 |
| 2017/0048520 A1* | 2/2017 | Seifi | H04N 19/172 |

FOREIGN PATENT DOCUMENTS

| | | |
|---|---|---|
| KR | 10-2010-0081886 | 7/2010 |
| KR | 10-2011-0088050 | 8/2011 |
| WO | 2015/017314 A1 | 2/2015 |

OTHER PUBLICATIONS

Extended European Search Report dated Feb. 26, 2016 in corresponding European Patent Application No. 15188265.1.
"Common Metadata 'md' namespace", Movie Labs Common Metadata Version 2.2, Motion Picture Laboratories, Inc., Oct. 2, 2014, pp. i-v, 1-82.
U.S. Notice of Allowance dated May 21, 2018 in U.S. Appl. No. 14/875,86.
U.S. Office Action dated Feb. 7, 2018 in U.S. Appl. No. 14/875,869.
U.S. Office Action dated Jul. 26, 2017 in U.S. Appl. No. 14/875,869.
U.S. Appl. No. 14/875,869, filed Oct. 6, 2015, Seung-Hoon Han, et al., Samsung Electronics Co., Ltd.
Chinese Office Action dated Nov. 1, 2018 in Chinese Patent Application No. 201580054198.4.
European Office Action dated Sep. 12, 2019 in European Patent Application No. 15188265.1.
Chinese Office Action dated Jun. 24, 2019 in Chinese Patent Application No. 201580054198.4.
Jiang Duan, et al., "Local Contrast Stretch Based Tone Mapping for High Dynamic Range Images", 2011 IEEE Symposium on Computational Intelligence for Multimedia, Signal and Vision Processing (CIMSIVP), Apr. 11, 2011,7 pages.
Hwann-Tzong Chen, et al., "Tone Reproduction: A Perspective from Luminance-Driven Perceptual Grouping", International Journal of Computer Vision, vol. 65, No. 1-2, Nov. 1, 2005, pp. 73-96.
Indian Office Action dated Oct. 16, 2019 in Indian Patent Application No. 201717015826.

* cited by examiner

DISPLAY DEVICE AND METHOD OF CONTROLLING THE SAME

CROSS-REFERENCE TO RELATED APPLICATIONS

This application is a continuation of U.S. patent application Ser. No. 14/875,869, filed on Oct. 6, 2015, which claims the benefit of Korean Patent Application Nos. 10-2014-0134135 and 10-2015-0024271, filed on Oct. 6, 2014 and Feb. 17, 2015, respectively, in the Korean Intellectual Property Office, the disclosures of which are incorporated herein by reference.

BACKGROUND

1. Field

Embodiments relate to a liquid crystal display with a heat generation unit to preheat a liquid crystal display panel and a driving method thereof.

2. Description of the Related Art

In general, a luminance of the actual world is known to have a dynamic range of 100,000,000:1. Also, a contrast range that can be distinguished by a human's eyes, that is, a dynamic range of a human's eyes, is known to be about 1,000:1 to 10,000:1. A dynamic range of cameras according to the newest technology is known to be about 10,000:1.

On the other hand, a liquid crystal display panel, a plasma display panel, an organic light emitting diode panel, and the like widely used as display devices have a dynamic range of about 100:1 to 1000:1.

That is, a dynamic range of images that can be output from display devices is narrower than a dynamic range that can be distinguished by a human's eyes and a dynamic range that can be detected by a camera or the like.

In this manner, an image having a dynamic range greater than a dynamic range of an image that can be output from a general display device is called a high dynamic range (HDR) image. In contrast to the high dynamic range image, an image having a dynamic range equal to or less than a dynamic range of an image that can be output from a general display device is called a low dynamic range (LDR) image.

When the high dynamic range image is input from such an image source, the display device performs an operation of converting the high dynamic range image into a displayable dynamic range. Such an operation is called "tone mapping."

Tone mapping methods in the related art include a method in which an entire dynamic range is compressed and the high dynamic range image is converted into the low dynamic range image, a method in which the high dynamic range image is directly displayed on a display device having a low dynamic range and the like.

However, according to the method in which the entire dynamic range of the high dynamic range image is compressed, there is a problem in that brightness of the image output from the display device significantly decreases compared to an original image.

Also, according to the method in which the high dynamic range image is directly displayed on the display device having a low dynamic range, there is a problem in that an image of a luminance, which is unable to be displayed on the display device, is not displayed.

SUMMARY

Additional aspects and/or advantages will be set forth in part in the description which follows and, in part, will be apparent from the description, or may be learned by practice of the embodiments.

There are provided a display device and a method of controlling the same through which an image displayed on a display device can maintain brightness of an original image without change, and image information included in a high luminance region can be displayed.

According to an aspect of the disclosed embodiments, there is provided a display device, including: a content receiving unit configured to receive a high dynamic range image and luminance information of the high dynamic range image; an image processing unit configured to perform tone mapping based on the luminance information such that the high dynamic range image is converted into a low dynamic range image; and a display unit configured to display the low dynamic image, wherein the luminance information includes a maximum luminance value and a minimum luminance value of the high dynamic range image.

The luminance information may include a maximum luminance value and a minimum luminance value of the high dynamic range image included in a scene.

The luminance information may include a maximum luminance value and a minimum luminance value of the high dynamic range image forming a frame.

The luminance information may include a maximum luminance value and a minimum luminance value of the high dynamic range image included in entire content.

The image processing unit may detect a first region whose luminance value is equal to or greater than a reference luminance value within the high dynamic range image, and perform tone mapping on an image of the first region based on feature information of the image of the first region; and the feature information may include at least one of edge information, texture information and gradation information of the high dynamic range image.

The image processing unit may detect an edge region within the image of the first region and generate a first mapping function based on a histogram of pixels included in the edge region.

The first mapping function may have a gradient that is changed according to the number of pixels included in the edge region.

In the first mapping function, a gradient of luminance values at which the number of pixels included in the edge region is great may be greater than a gradient of luminance values at which the number of pixels included in the edge region is small.

The first mapping function may be a cumulative histogram obtained by integrating a histogram of pixels included in the edge region.

The image processing unit may detect a texture region within the image of the first region and generate a first mapping function based on a histogram of pixels included in the texture region.

The image processing unit may detect a gradation region within the image of the first region and generate a first mapping function based on a histogram of pixels included in the gradation region.

The image processing unit may generate a second mapping function based on a luminance value of the high dynamic range image.

The image processing unit may perform second tone mapping according to the second mapping function on the high dynamic range image, and perform first tone mapping according to the first mapping function on the image on which the second tone mapping is performed.

The image processing unit may generate a second mapping function based on a luminance value of a second region whose luminance value is less than the reference luminance value within the high dynamic range image.

The image processing unit may generate a tone mapping function based on the first mapping function and the second mapping function, and convert the high dynamic range image into the low dynamic range image according to the tone mapping function. The image processing unit may perform linear tone mapping on a first pixel whose luminance value is less than a reference luminance value among a plurality of pixels included in the high dynamic range image, and perform nonlinear tone mapping on a second pixel whose luminance value is equal to or greater than the reference luminance value among the plurality of pixels.

When a scene average luminance value of the high dynamic range image included in a scene is less than a reference luminance value, the image processing unit may perform linear tone mapping on a first pixel whose luminance value is less than the reference luminance value among a plurality of pixels included in the high dynamic range image and perform nonlinear tone mapping on a second pixel whose luminance value is equal to or greater than the reference luminance value among the plurality of pixels.

When a scene average luminance value of the high dynamic range image included in a scene is equal to or greater than a reference luminance value, the image processing unit may perform linear tone mapping on a first pixel whose luminance value is less than the scene average luminance value among a plurality of pixels included in the high dynamic range image and perform nonlinear tone mapping on a second pixel whose luminance value is equal to or greater than the scene average luminance value among the plurality of pixels.

According to another aspect of the disclosed embodiments, there is provided a method of controlling a display device, including: receiving a high dynamic range image and luminance information of the high dynamic range image; performing tone mapping based on the luminance information such that the high dynamic range image is converted into a low dynamic range image; and displaying the low dynamic image, wherein the luminance information includes a maximum luminance value and a minimum luminance value of the high dynamic range image.

The luminance information may include a maximum luminance value and a minimum luminance value of the high dynamic range image included in a scene.

The luminance information may include a maximum luminance value and a minimum luminance value of the high dynamic range image forming a frame.

The luminance information may include a maximum luminance value and a minimum luminance value of the high dynamic range image included in entire content.

The performing of the tone mapping may include: detecting a first region whose luminance value is equal to or greater than a reference luminance value within the high dynamic range image, generating a tone mapping function based on feature information of an image of the first region; and performing tone mapping on the high dynamic range image according to the tone mapping function in order to convert the high dynamic range image into the low dynamic image. The feature information may include at least one of edge information, texture information and gradation information of the high dynamic range image.

According to an aspect of the disclosed embodiments, there are provided a display device and a method of controlling the same through which different tone mapping functions are used for a high luminance region and a low luminance region, and thus an image displayed on a display device can maintain brightness of an original image, and image information included in a high luminance region can be displayed.

According to another aspect of the disclosed embodiments, there is provided a method of controlling a display device, including determining a first region of an image having a luminance higher than a second region of the image, determining first and second mapping functions corresponding to the first and second regions, where the first mapping function enhances one or more image features and the second mapping function increases brightness, and mapping the image using the first and second mapping functions responsive to luminance to preserve brightness of the image of the second region and preserve feature information of the image of the first region.

BRIEF DESCRIPTION OF THE DRAWINGS

These and/or other aspects of the embodiments will become apparent and more readily appreciated from the following description of the embodiments, taken in conjunction with the accompanying drawings of which.

DETAILED DESCRIPTION

Figure 1:
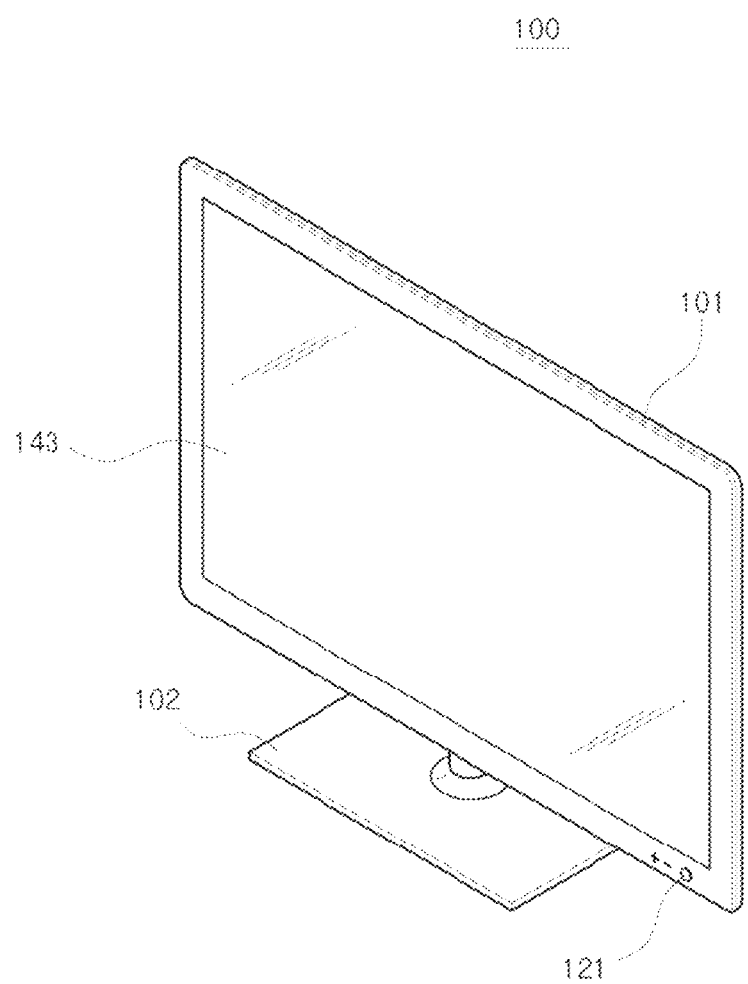
FIG. 1 illustrates an exterior of a display device according to an embodiment.

Reference will now be made in detail to the embodiments, examples of which are illustrated in the accompanying drawings, wherein like reference numerals refer to the like elements throughout. The embodiments are described below by referring to the figures.

Embodiments described in this specification and configurations illustrated in drawings are only exemplary examples of the disclosed embodiments. The embodiments cover various modifications that can substitute for the embodiments herein and drawings at the time of filing of this application.

Hereinafter, an embodiment will be described in detail with reference to the accompanying drawings.

Figure 2:
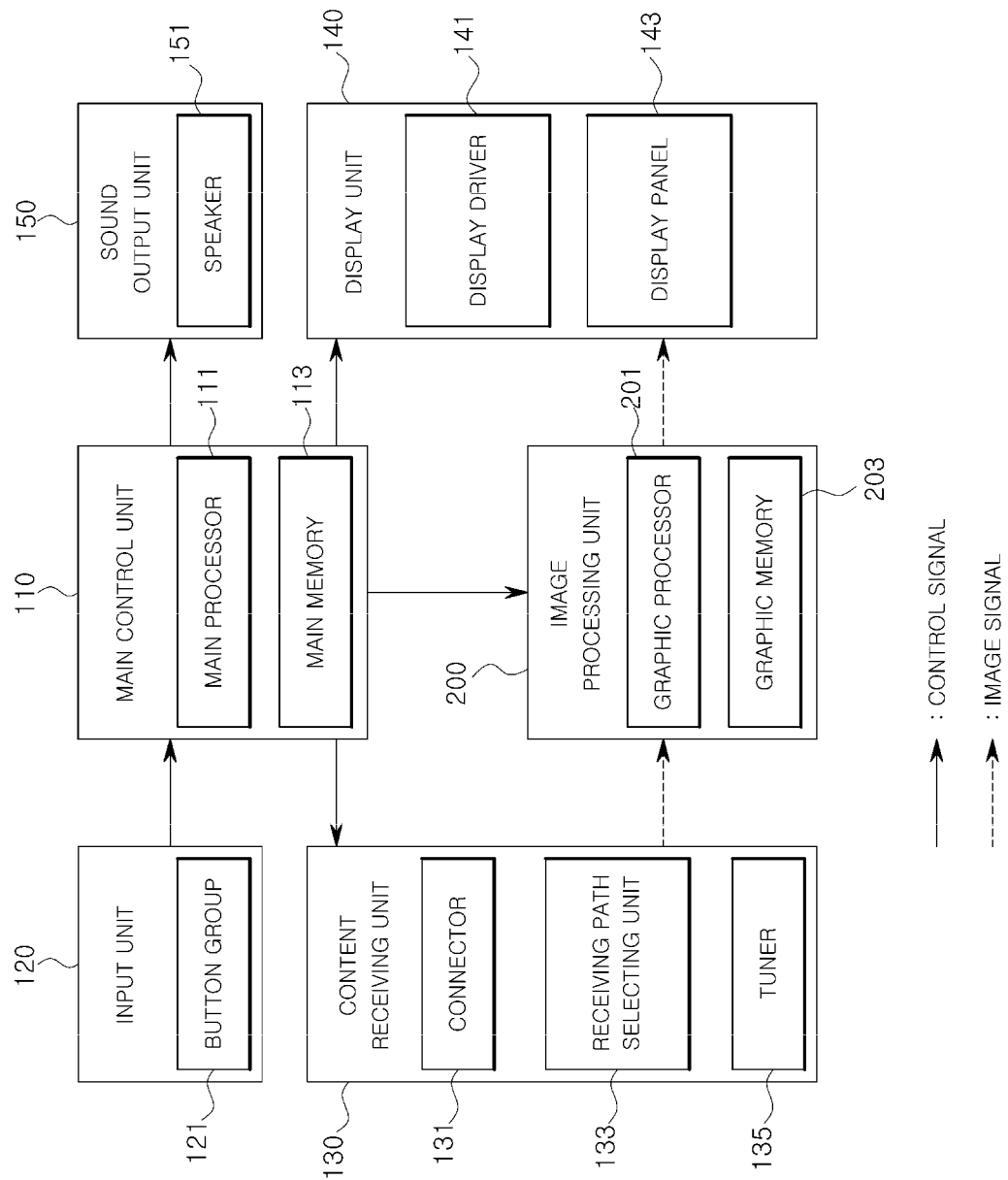
FIG. 2 illustrates a control configuration of a display device according to an embodiment.

FIG. 1 illustrates an exterior of a display device according to an embodiment. FIG. 2 illustrates a control configuration of a display device according to an embodiment.

A display device 100 is a device that may process an image signal received from the outside and visually display the processed image. Hereinafter, a case in which the display device 100 is a television (TV) will be exemplified, but the present embodiment is not limited thereto. For example, the display device 100 may be implemented in various types such as a monitor, a mobile multimedia device or a mobile communication device. A type of the display device 100 is not limited as long as a device visually displays an image.

As illustrated in FIGS. 1 and 2, the display device 100 includes a main body 101 that forms an exterior of the display device 100 and accommodates various components of the display device 100.

A stand 102 supporting the main body 101 may be provided below the main body 101. The main body 101 may be stably disposed on a plane by the stand 102. However, the present embodiment is not limited thereto, but the main body 101 may be installed on a vertical surface such as a wall surface by a bracket or the like.

A button group 121 configured to receive a user control command from the user and a display panel 143 configured to display an image according to the user control command may be provided in the front of the main body 101.

Also, various components configured to implement functions of the display device 100 may be provided in the main body 101. A control configuration illustrated in FIG. 2 may be provided in the main body 101.

Specifically, the display device 100 includes an input unit 120 configured to receive the user control command from the user, a content receiving unit 130 configured to receive content including an image and a sound from an external device, an image processing unit 200 configured to process image data included in the content, a display unit 140 configured to display an image corresponding to the image data included in the content, a sound output unit 150 configured to output a sound corresponding to sound data included in the content and a main control unit 110 configured to overall control operations of the display device 100.

The input unit 120 may include the button group 121 configured to receive various user control commands from the user. For example, the button group 121 may include a volume button for regulating a magnitude of a sound output from the sound output unit 150, a channel button for changing a communication channel through which the content receiving unit 130 receives content, a power button for turning power of the display device 100 on or off and the like.

Various buttons included in the button group 121 may use a push switch configured to detect the user pressing, a membrane switch or a touch switch configured to detect contact of a part of the user's body. However, the present embodiment is not limited thereto, but the button group 121 may use various input methods that can output an electrical signal corresponding to a specific operation of the user.

Also, the input unit 120 may include a remote controller that receives the user control command from the user remotely and transmits the received user control command to the display device 100.

The content receiving unit 130 may receive various pieces of content from various external devices.

For example, the content receiving unit 130 may receive content from an antenna configured to wirelessly receive a broadcasting signal, a set-top box configured to receive a broadcasting signal in a wired or wireless manner and appropriately convert the received broadcasting signal, a multimedia playback device (for example, a DVD player, a CD player or a blu-ray player) configured to play content stored in a multimedia storage medium and the like.

Specifically, the content receiving unit 130 may include a plurality of connectors 131 connected to the external device, a receiving path selecting unit 133 configured to select a path through which content is received from among the plurality of connectors 131, a tuner 135 configured to select a channel (or a frequency) through which a broadcasting signal is received when the broadcasting signal is received and the like.

The connector 131 may include a coaxial cable connector (an RF coaxial cable connector) configured to receive a broadcasting signal including content from the antenna, a high definition multimedia interface (HDMI) connector configured to receive content from the set-top box or the multimedia playback device, a component video connector, a composite video connector, a D-sub connector and the like.

The receiving path selecting unit 133 selects a connector through which content is received from among the plurality of connectors 131 described above. For example, the receiving path selecting unit 133 may automatically select the connector 131 through which content has been received or manually select the connector 131 through which content will be received according to the user control command of the user.

The tuner 135 extracts a transmission signal of a specific frequency (channel) from various signals that are received through the antenna and the like when the broadcasting signal is received. In other words, the tuner 135 may select a channel (or a frequency) through which content is received according to a channel selecting command of the user.

The image processing unit 200 processes image content in the content received by the content receiving unit 130 and provides the processed image data to the display unit 140.

The image processing unit 200 may be a computer and may include a graphic processor 201 and a graphic memory 203.

The graphic memory 203 may store an image processing program for image processing and image processing data, or temporarily store image data output from the graphic processor 201 or image data received from the content receiving unit 130.

The graphic memory 203 may include a volatile memory such as an SRAM or a DRAM and a non-volatile memory such as a flash memory, a read only memory (ROM), an erasable programmable read only memory (EPROM) or an electrically erasable programmable read only memory (EEPROM).

For example, the non-volatile memory may semi permanently store the image processing program for image processing and the image processing data. The volatile memory may temporarily store the image processing program and the image processing data loaded from the non-volatile memory, the image data received from the content receiving unit 130 or the image data output from the graphic processor 201.

Also, the non-volatile memory may be provided separately from the volatile memory and form an auxiliary memory device of the volatile memory.

The graphic processor 201 may process the image data stored in the graphic memory 203 according to the image processing program stored in the graphic memory 203. For example, the graphic processor 201 may perform image processing such as image linearization and tone mapping to be described below.

While the graphic processor 201 and the graphic memory 203 have been separately described above, the present embodiment is not limited to a case in which the graphic processor 201 and the graphic memory 203 are provided as separate chips. The graphic processor 201 and the graphic memory 203 may be provided as a single chip.

Detailed operations of the image processing unit 200 will be described in detail below.

The display unit 140 may include a display panel 143 configured to visually display an image and a display driver 141 configured to drive the display panel 143.

The display panel 143 may output an image according to image data received from the display driver 141.

The display panel 143 may include a pixel, which is a unit of displaying an image. Each pixel may receive an electrical signal indicating image data and output an optical signal corresponding to the received electrical signal.

In this manner, optical signals output from a plurality of pixels included in the display panel 143 are combined and thus one image is displayed on the display panel 143.

Also, the display panel 143 may be classified as several types according to a method in which each pixel outputs an optical signal. For example, the display panel 143 may be classified as a light-emitting display in which a pixel itself emits light, a transmissive display configured to block or transmit light emitted from a backlight or the like, or a reflective display configured to reflect or absorb incident light from an external light source.

The display panel 143 may use a cathode ray tube (CRT) display, a liquid crystal display (LCD) panel, a light emitting diode (LED) panel, an organic light emitting diode (OLED), a plasma display panel (PDP), a field emission display (FED) panel or the like. However, the display panel 143 is not limited thereto, and the display panel 143 may use various display methods through which an image corresponding to image data can be visually displayed.

The display driver 141 receives image data from the image processing unit 200 according to a control signal of the main control unit 110 and drives the display panel 143 to display an image corresponding to the received image data.

Specifically, the display driver 141 delivers an electrical signal corresponding to image data to each of the plurality of pixels of the display panel 143.

The display driver 141 may deliver the electrical signal to each of the pixels using various methods in order to deliver the electrical signal to all pixels of the display panel 143 within a short time.

For example, according to an interlace scanning method, the display driver 141 may alternately deliver the electrical signal to pixels of odd-numbered columns and pixels of even-numbered columns among the plurality of pixels.

Also, according to a progressive scanning method, the display driver 141 may sequentially deliver the electrical signal to the plurality of pixels in units of columns.

In this manner, when the display driver 141 delivers the electrical signal corresponding to image data to each of the pixels of the display panel 143, each of the pixels outputs an optical signal corresponding to the received electrical signal, the optical signals output from the pixels are combined and one image is displayed on the display panel 143.

The sound output unit 150 may output a sound corresponding to sound data within the content received by the content receiving unit 130 according to the control signal of the main control unit 110. The sound output unit 150 may include at least one speaker 151 configured to convert an electrical signal into a sound signal.

The main control unit 110 may include a main processor 111 and a main memory 113.

The main memory 113 may store a control program and control data for controlling operations of the display device 100, and temporarily store the user control command received through the input unit 120 or a control signal output from the main processor 111.

The main memory 113 may include a volatile memory such as an SRAM or a DRAM and a non-volatile memory such as a flash memory, a read only memory (ROM), an erasable programmable read only memory (EPROM) or an electrically erasable programmable read only memory (EEPROM).

For example, the non-volatile memory may semi permanently store a control program and control data for controlling the display device 100. The volatile memory may temporarily store a control program and control data loaded from the non-volatile memory, the user control command received through the input unit 120 or the control signal output from the main processor 111.

Also, the non-volatile memory may be provided separately from the volatile memory and form an auxiliary memory device of the volatile memory.

The main processor 111 may process various types of data stored in the main memory 113 according to the control program stored in the main memory 113.

For example, the main processor 111 may process the user control command input through the input unit 120, generate a channel selection signal for selecting a path through which the content receiving unit 130 receives content according to the user control command, and generate a volume control signal for regulating a magnitude of a sound output from the sound output unit 150 according to the user control command.

While the main processor 111 and the main memory 113 have been separately described above, the present embodiment is not limited to a case in which the main processor 111 and the main memory 113 are provided as separate chips. The main processor 111 and the main memory 113 may be provided as a single chip.

The main control unit 110 may control operations of various components included in the display device 100 according to a control command of the user. In particular, the main control unit 110 may control the image processing unit 200 to perform image processing on the image data received by the content receiving unit 130 and control the display unit 140 to display the image-processed image data.

Hereinafter, a configuration of the image processing unit 200 will be described.

Figure 3:
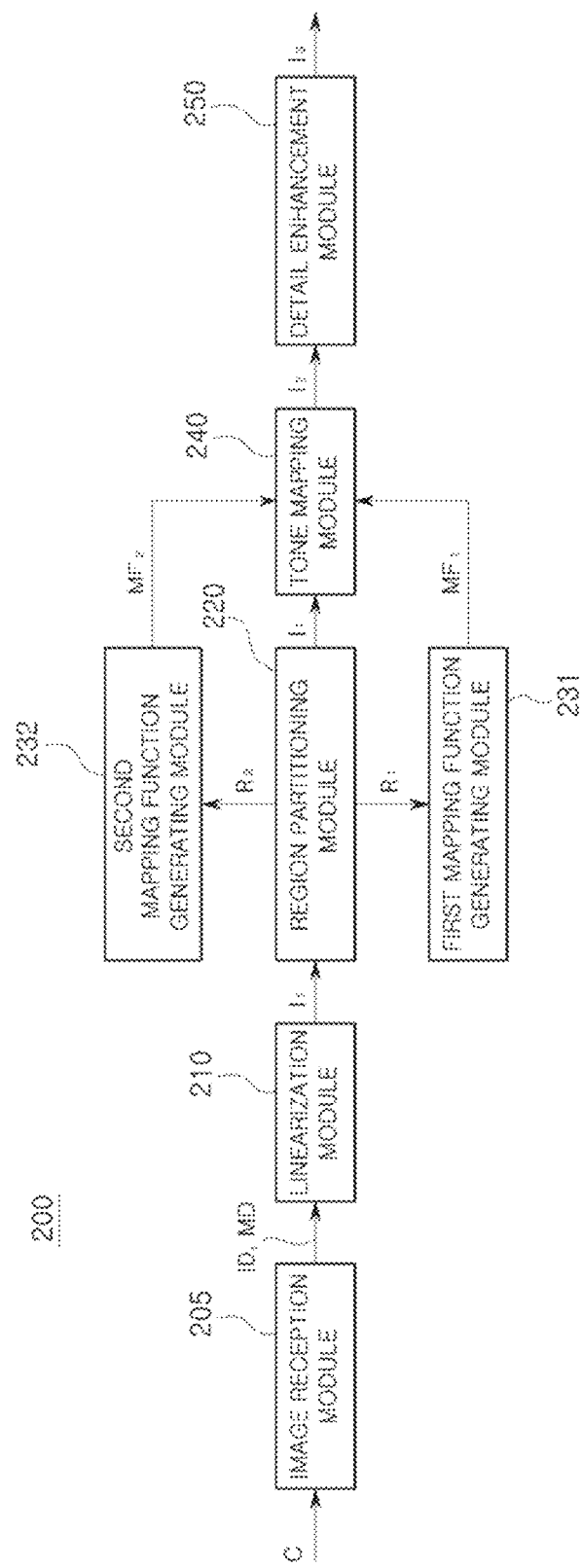
FIG. 3 illustrates an exemplary image processing unit included in a display device according to an embodiment.

FIG. 3 illustrates an exemplary image processing unit included in a display device according to an embodiment.

As described above, the image processing unit 200 includes the graphic processor 201 and the graphic memory 203 as hardware components.

Also, the image processing unit 200 may include various image processing modules as software components. Specifically, the graphic processor 201 may perform various image processing operations according to the image processing program and the image processing data stored in the graphic memory 203. When the image processing unit 200 is divided according to the image processing operations performed by the graphic processor 201, the image processing unit 200 may include various image processing modules as illustrated in FIG. 3.

As illustrated in FIG. 3, the image processing unit 200 may include an image reception module 205 configured to receive image data ID and metadata MD, a linearization module 210 configured to linearize the image data, a region partitioning module 220 configured to partition an image based on a luminance, a first mapping function generating module 231 configured to generate a tone mapping function of a first region having a high luminance, a second mapping function generating module 232 configured to generate a tone mapping function of a second region having a low luminance, a tone mapping module 240 configured to perform tone mapping, and a detail enhancement module 250 configured to perform a post-processing operation on the image on which tone mapping is performed.

The image reception module 205 receives content C from the content receiving unit 130 and outputs the image data ID included in the received content C and the metadata MD related to the image data ID. Here, the metadata MD may include information on the image data ID.

The linearization module 210 linearizes the image data ID and outputs a linearized original image $I_1$.

The region partitioning module 220 receives the original image $I_1$ from the linearization module 210, partitions the received original image $I_1$ into a first region $R_1$ and a second region $R_2$, and outputs an image of the first region $R_1$ and an image of the second region $R_2$.

The first mapping function generating module 231 receives the image of the first region $R_1$ from the region partitioning module 220, and generates and outputs a first mapping function $MF_1$ based on the image of the first region $R_1$.

The second mapping function generating module 232 receives the image of the second region $R_2$ from the region partitioning module 220 and generates and outputs a second mapping function $MF_2$ based on the image of the second region $R_2$.

The tone mapping module 240 receives the first mapping function $MF_1$ and the second mapping function $MF_2$ from the first mapping function generating module 231 and the second mapping function generating module 232, respectively, and generates a tone mapping function TMF based on the first mapping function $MF_1$ and the second mapping function $MF_2$.

Also, the tone mapping module 240 performs tone mapping on the original image according to the generated tone mapping function TMF and outputs a first image $I_2$.

The detail enhancement module 250 receives the first image $I_2$ from the tone mapping module 240, performs a detail enhancement operation on the received first image $I_2$, and outputs a second image $I_3$ on which detail enhancement is performed.

The image processing unit 200 receives image data of a high dynamic range from the content receiving unit 130, generates a display image of a low dynamic range from the received image data of a high dynamic range, and delivers the generated display image to the display unit 140.

Hereinafter, operations of respective modules included in the image processing unit 200 will be described.

First, the image reception module 205 will be described.

The image reception module 205 extracts the image data ID and the metadata MD from the content C received by the content receiving unit 130.

The content C includes the image data ID representing the original image and the metadata MD related to the image data ID.

The metadata MD may include luminance information of the image data ID. When the content C is, for example, a video, the metadata MD may include luminance information of the entire content C, luminance information of each scene included in the content C, luminance information of each frame included in the content C and the like. Here, the frame refers to a single still image forming the video. Also, the scene refers to a bundle of a series of frames representing a single condition in a single background. In other words, the scene may be understood as a bundle of successive frames in which an image is not significantly changed.

Specifically, the metadata MD may include a maximum luminance value, a minimum luminance value and an average luminance value of a plurality of images included in the content C. Also, the metadata MD may include a maximum luminance value, a minimum luminance value and an average luminance value of an image included in each scene. Also, the metadata MD may include a maximum luminance value, a minimum luminance value and an average luminance value of an image forming each frame.

In this manner, the image reception module 205 may extract luminance information of each scene or luminance information of each frame from the content C in addition to the image data ID.

Next, the linearization module 210 will be described.

Figure 5:
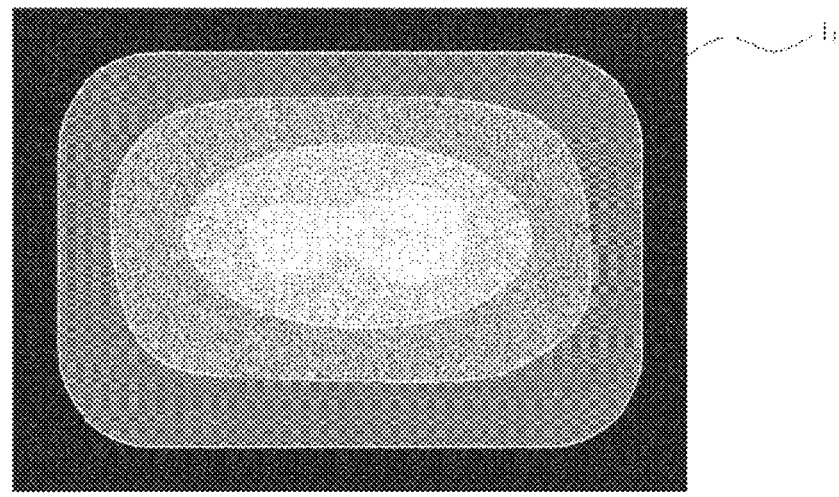
FIG. 5 illustrates an exemplary original image.
Figure 6:
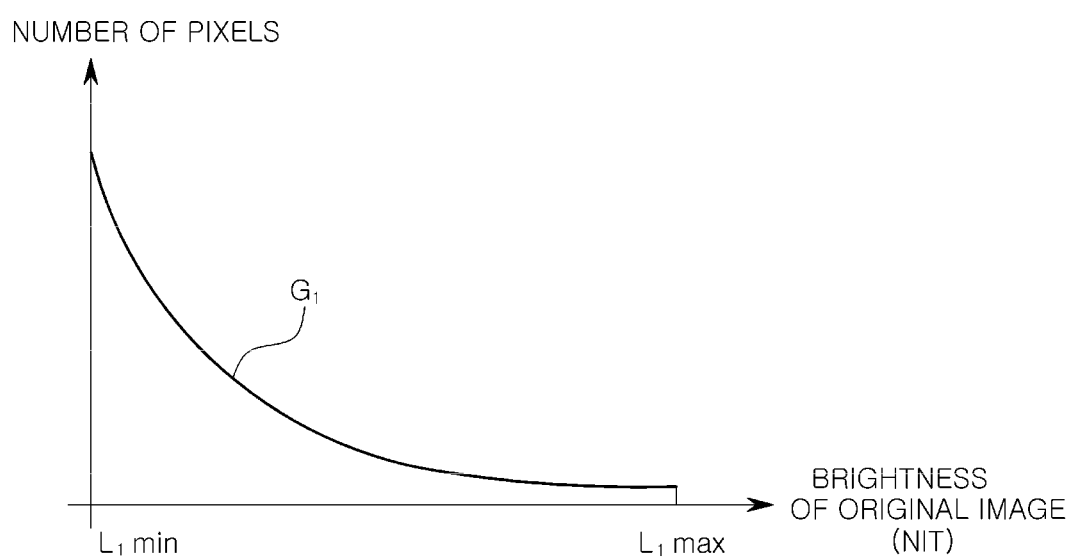
FIG. 6 illustrates a luminance histogram of the original image illustrated in FIG. 5.

FIG. 4 illustrates an exemplary operation of linearizing image data by an image processing unit included in a display device according to an embodiment. Also, FIG. 5 illustrates an exemplary original image. FIG. 6 illustrates a luminance histogram of the original image illustrated in FIG. 5.

As illustrated in FIG. 4, the linearization module 210 linearizes the image data ID received from the image reception module 205 and calculates a luminance value of each of the pixels included in the linearized image.

The image data received by the content receiving unit 130 may be different from an actual image due to various reasons. For example, there may be a difference between an image of an actual imaging target according to an image sensor configured to obtain an image of an imaging target and an image according to the image data. Also, during a process in which an image is compressed or encoded in order to transmit or store the image data, there may be a difference between an initially transmitted image and the image according to the image data.

In particular, since a high dynamic range image includes a great amount of information, it is necessary to compress or encode the image in order to transmit the image via a communication network or store the image in a storage medium.

An original image whose maximum luminance is $L_1max$ and whose minimum luminance is $L_1min$ may be converted into image data whose identifiable dynamic range is $N_1$ ($N_0$ to $N_1$) (in this case, a difference between $L_1max$ and $L_1min$ is assumed to be a number greater than $N_1$). For example, an original image whose difference between the maximum luminance $L_1max$ and the minimum luminance $L_1min$ is 10,000 nits may be compressed to image data whose expressible range is 2000 nits.

When the dynamic range of the image decreases, a size of the image data decreases. However, there is a concern about some pieces of information included in the original image being lost. In this manner, when a dynamic range $L_1$ of the original image is greater than a dynamic range $N_1$ of the image data, a first non-linear mapping function $F_1$ illustrated in FIG. 4A may be used in order to minimize information that is lost during the encoding or compressing process.

When the first non-linear mapping function $F_1$ is used, a region including a great amount of information and a region including a small amount of information within the original image are compressed at different compression ratios. In other words, in the region including a great amount of information, an image is compressed at a low compression ratio. In the region including a small amount of information, an image is compressed at a high compression ratio. Accordingly, it is possible to increase compression efficiency, and the image data may include a greater amount of information.

Figure 4A:
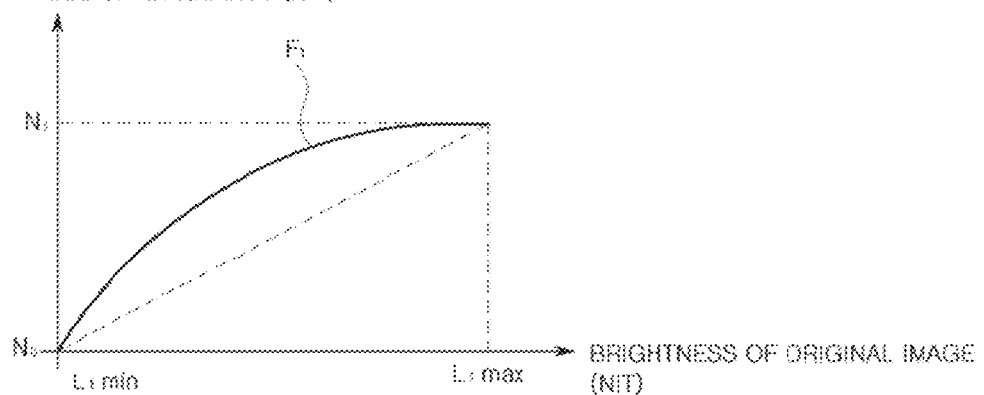
FIGS. 4A-4B illustrate an exemplary operation of linearizing image data by an image processing unit included in a display device according to an embodiment.

The image data ID included in the content C received by the content receiving unit 130 may be image data that is nonlinearly compressed by the first non-linear mapping function $F_1$ illustrated in FIG. 4A.

The linearization module 210 linearizes the image data that is nonlinearly compressed in this manner.

Figure 4B:
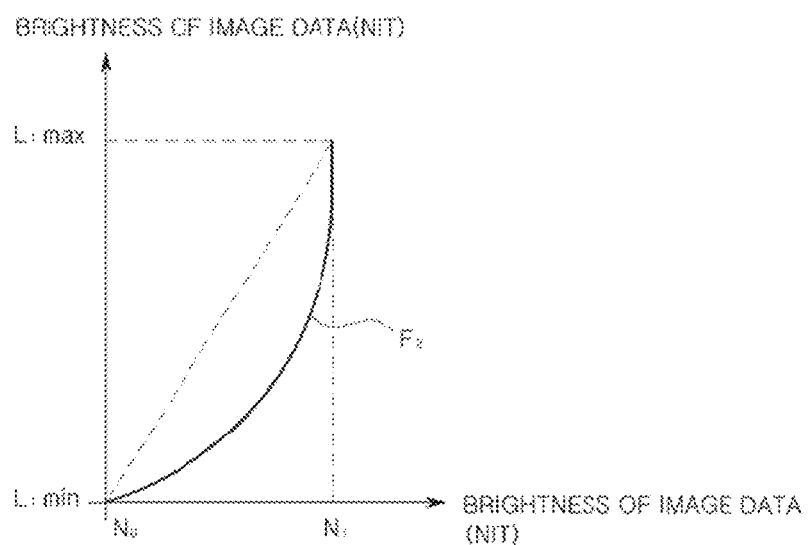

Specifically, the linearization module 210 may linearize the nonlinearly compressed image data using a second non-linear mapping function $F_2$ illustrated in FIG. 4B and luminance information of the original image $I_1$. Also, the luminance information of the original image $I_1$ may be received from the image reception module 205 described above, the luminance information of the original image $I_1$ may include a maximum luminance value and a minimum luminance value in units of scenes, or a maximum luminance value and a minimum luminance value in units of frames.

Here, the second non-linear mapping function $F_2$ may use an inverse function of the first non-linear mapping function $F_1$ that is used to compress the original image to image data.

The first non-linear mapping function $F_1$ compressing the original image to image data corresponds to a function that is well-known by international standards or the like. Therefore, the linearization module 210 may generate the second non-linear mapping function $F_2$ based on the first non-linear mapping function $F_1$. Also, the second non-linear mapping function $F_2$ may be stored in the graphic memory 203 in advance.

The image data ID received from the content receiving unit 130 may be restored to the original image by the linearization module 210.

For example, the restored original image may be the original image $I_1$ as illustrated in FIG. 5.

Also, the linearization module 210 may analyze a luminance of the original image $I_1$.

Specifically, the linearization module 210 may obtain a maximum luminance value $L_1max$, a minimum luminance value $L_1min$ and an average luminance value of the original image $I_1$.

The linearization module 210 may obtain the maximum luminance value $L_1max$, the minimum luminance value $L_1min$ and the average luminance value of the original image $I_1$ using various methods.

As described above, the maximum luminance value $L_1max$, the minimum luminance value $L_1min$ and the average luminance value of the original image $I_1$ may be received from the external device in the form of metadata MD of the image data ID.

In this case, the maximum luminance value $L_1max$, the minimum luminance value $L_1min$ and the average luminance value may be provided in units of content C, in units of frames of an image, or in units of scenes of an image. When the value is provided in units of scenes, the linearization module 210 may refer to a maximum luminance value $L_1max$, a minimum luminance value $L_1min$ and an average luminance value of a previous frame.

When the metadata MD of the received content C does not include the maximum luminance value $L_1max$, the minimum luminance value $L_1min$ or the average luminance value, the linearization module 210 may directly calculate the maximum luminance value $L_1max$, the minimum luminance value $L_1min$ and the average luminance value from the linearized original image.

The linearization module 210 may calculate a luminance value of a pixel included in the original image $I_1$ using Equation 1. Here, each of the pixels of the linearized original image includes a red color value, a green color value, and a blue color value.

$$L=0.2126R+0.7152G+0.0722B \qquad \text{[Equation 1]}$$

(where, L denotes a luminance value of a pixel, R denotes a red color value of a pixel, G denotes a green color value of a pixel, and B denotes a blue color value of a pixel.)

A luminance value of each of the pixels included in the original image may be represented as a luminance histogram. Here, a luminance histogram $G_1$ of the original image $I_1$ represents a frequency distribution of pixels according to the luminance value. That is, an x axis of the luminance histogram $G_1$ represents a luminance value, and a y axis represents the number of pixels corresponding to the luminance value.

For example, the linearization module 210 may represent the original image $I_1$ illustrated in FIG. 5 as the luminance histogram $G_1$ illustrated in FIG. 6. As illustrated in FIG. 6, in an example of the original image $I_1$ illustrated in FIG. 5, the number of pixels having the lowest luminance is the greatest, and the number of pixels decreases as the luminance increases.

The luminance histogram $G_1$ has been described above to facilitate understanding, but this is only an example for facilitating understanding. The image processing unit 200 does not necessarily generate the luminance histogram $G_1$. The image processing unit 200 may generate the luminance histogram $G_1$ as necessary.

Next, the region partitioning module 220 will be described.

Figure 7:
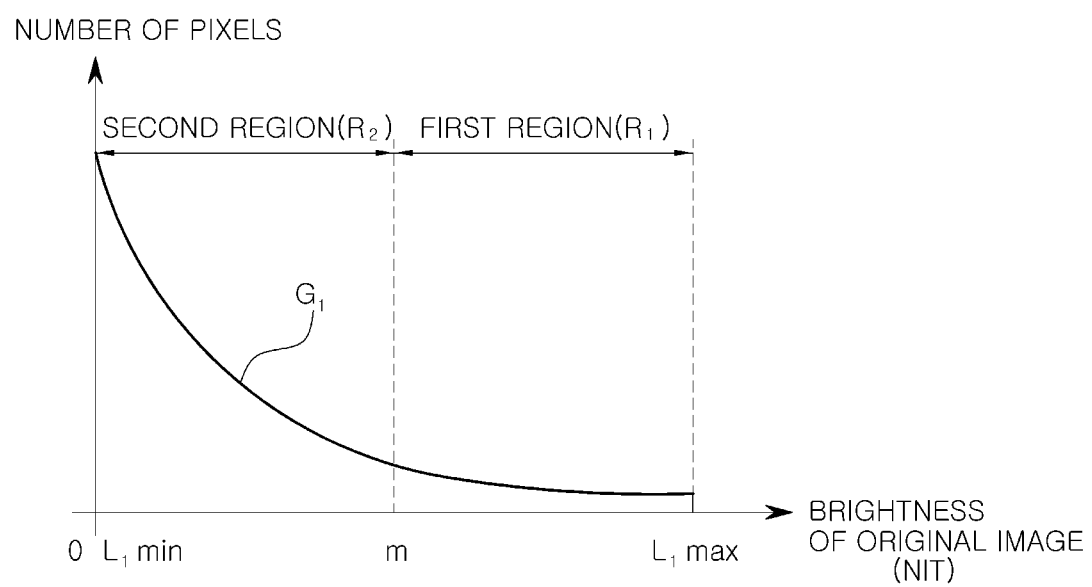
FIG. 7 illustrates an example in which the original image illustrated in FIG. 5 is partitioned according to a luminance value of a pixel.
Figure 8:
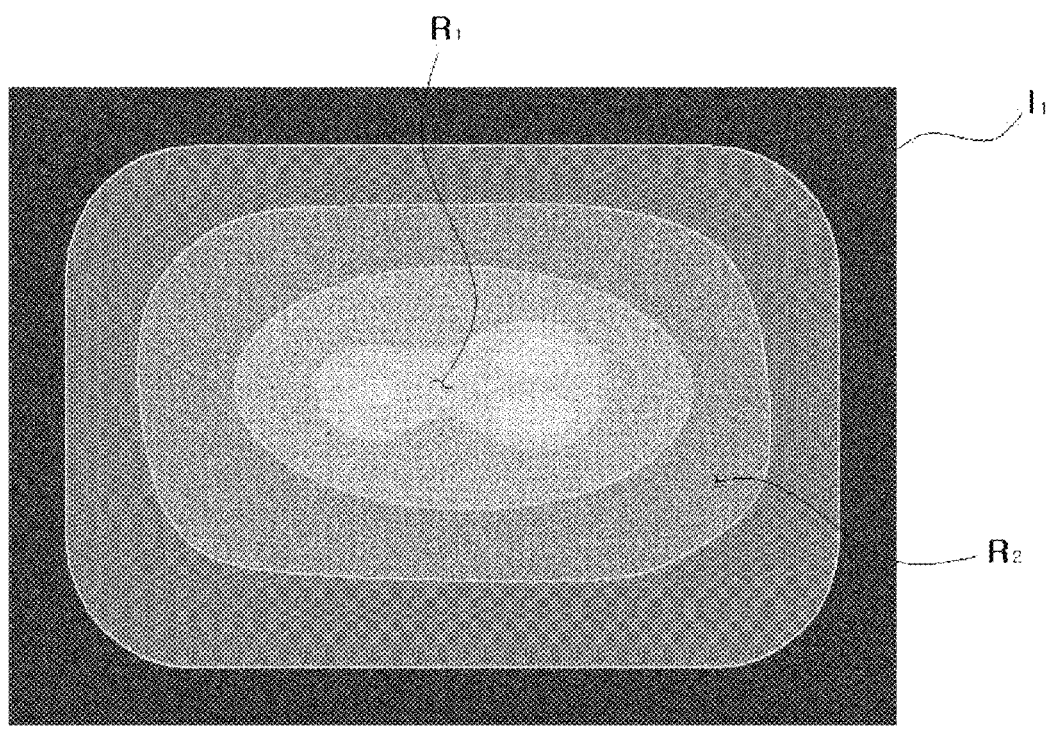
FIG. 8 illustrates an exemplary image obtained by partitioning the original image illustrated in FIG. 5 according to a luminance value.

FIG. 7 illustrates an example in which the original image illustrated in FIG. 5 is partitioned according to a luminance value of a pixel. FIG. 8 illustrates an exemplary image obtained by partitioning the original image illustrated in FIG. 5 according to a luminance value. Also, FIG. 9 illustrates another exemplary image obtained by partitioning the original image illustrated in FIG. 5 according to a luminance value.

As illustrated in FIGS. 7, 8 and 9, the region partitioning module 220 partitions the original image into the first region $R_1$ and the second region $R_2$ based on a first reference luminance value m according to luminances of the plurality of pixels. Specifically, the region partitioning module 220 may partition the original image into a first region including pixels whose luminances are equal to or greater than the reference luminance value m, and a second region including pixels whose luminances are less than the first reference luminance value m.

When the luminance histogram $G_1$ illustrated in FIG. 6 is exemplified, the plurality of pixels of the original image $I_1$ may be classified as pixels included in the first region $R_1$ or pixels included in the second region $R_2$ based on the first reference luminance value m as illustrated in FIG. 7.

Here, the first reference luminance value m may be set to the maximum luminance value that can be maximally output from the display device 100 or a luminance value smaller than the maximum luminance value.

Also, the first reference luminance value m may be set by the user or may be a predetermined value.

When the original image $I_1$ illustrated in FIG. 5 is partitioned into the first region $R_1$ and the second region $R_2$ according to the first reference luminance value m, the image may be partitioned into the first region $R_1$ in which a luminance value of a pixel is equal to or greater than the first reference luminance value m and the second region $R_2$ in which a luminance value of a pixel is less than the first reference luminance value m as illustrated in FIG. 8.

Also, the region partitioning module 220 may set a pixel whose luminance value is equal to or greater than the first reference luminance value m and a pixel near the pixel whose luminance value is equal to or greater than the first reference luminance value m as the first region $R_1$. This is because continuity of the image needs to be maintained after tone mapping is performed.

Figure 9A:
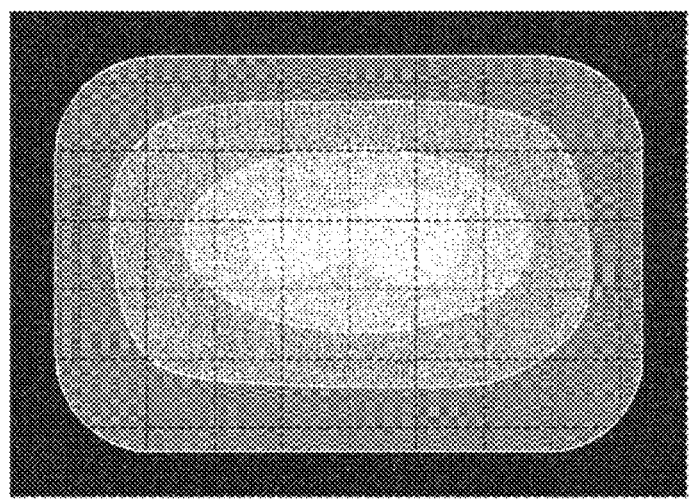
FIGS. 9A-9B illustrate another exemplary image obtained by partitioning the original image illustrated in FIG. 5 according to a luminance value.

For example, the region partitioning module 220 may partition the original image $I_1$ into a plurality of regions as illustrated in FIG. 9A.

Then, the region partitioning module 220 may set regions such that a region including a pixel whose luminance value is equal to or greater than the first reference luminance value m is the first region $R_1$, and a region including no pixel whose luminance value is equal to or greater than the first reference luminance value m in the partitioned region is the second region $R_2$.

Figure 9B:
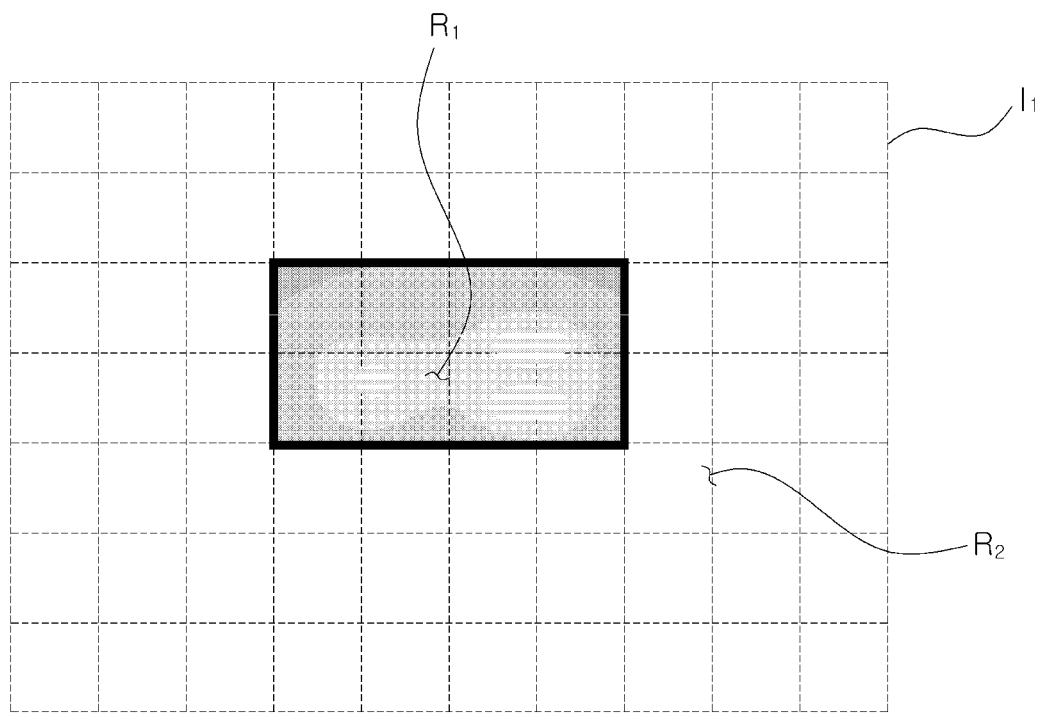

When the original image $I_1$ illustrated in FIG. 5 is partitioned into the first region $R_1$ and the second region $R_2$ in this manner, the region partitioning module 220 may set the pixel whose luminance value is equal to or greater than the first reference luminance value m and the pixel near the pixel whose luminance value is equal to or greater than the first reference luminance value m as the first region $R_1$ as illustrated in FIG. 9B.

Next, the first mapping function generating module 231 will be described.

Figure 10A:
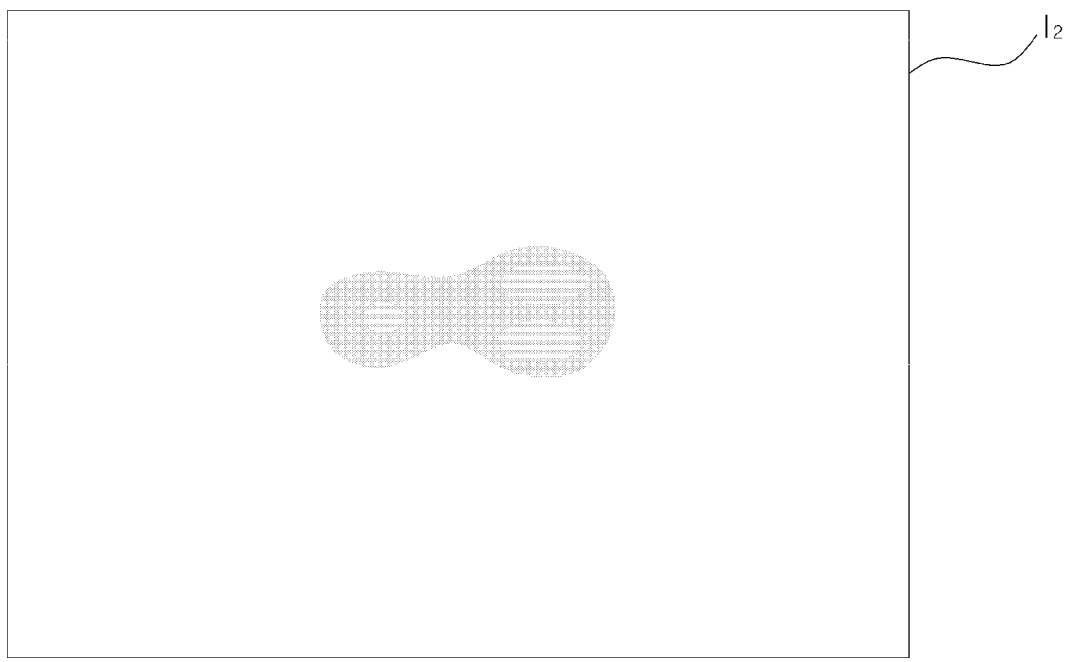
FIGS. 10A-10B illustrate an example in which the image processing unit illustrated in FIG. 3 extracts a feature point from a first region.

FIG. 10 illustrates an example in which the image processing unit illustrated in FIG. 3 extracts a feature point from a first region. Also, FIG. 11 illustrates an example in which the image processing unit illustrated in FIG. 3 generates a first mapping function based on a feature point of a first region. FIG. 12 illustrates another example in which the image processing unit illustrated in FIG. 3 generates a first mapping function according to a feature point of a first region.

As illustrated in FIGS. 10, 11 and 12, the first mapping function generating module 231 generates the first mapping function $MF_1$ based on the image of the first region $R_1$.

Here, the first mapping function $MF_1$ refers to a parameter function of converting the image of the first region $R_1$ within the original image $I_1$, which is the high dynamic range image, into a low dynamic range image. In other words, the image of the first region $R_1$ is converted into the low dynamic range image by the first mapping function $MF_1$.

Specifically, the first mapping function $MF_1$ converts the high dynamic range image whose luminance value ranges between the first reference luminance value m and a maximum original luminance value $L_1$max into the low dynamic range image whose luminance value ranges between a second reference luminance value n and a maximum display luminance value $L_2$max. Here, the second reference luminance value n may be set by the user or may be appropriately set in advance by a designer of the display device 100.

The first mapping function generating module 231 extracts pixels including feature information, and generates the first mapping function $MF_1$ based on a histogram of the extracted pixels. Here, the feature information may include edge information of the image included in the first region $R_1$, texture information of the image and gradation information of the image.

The first mapping function generating module 231 may generate the first mapping function $MF_1$ for vividly displaying an edge of the first region $R_1$, vividly displaying a texture of the image, or vividly displaying a gradation of the image.

Figure 10B:
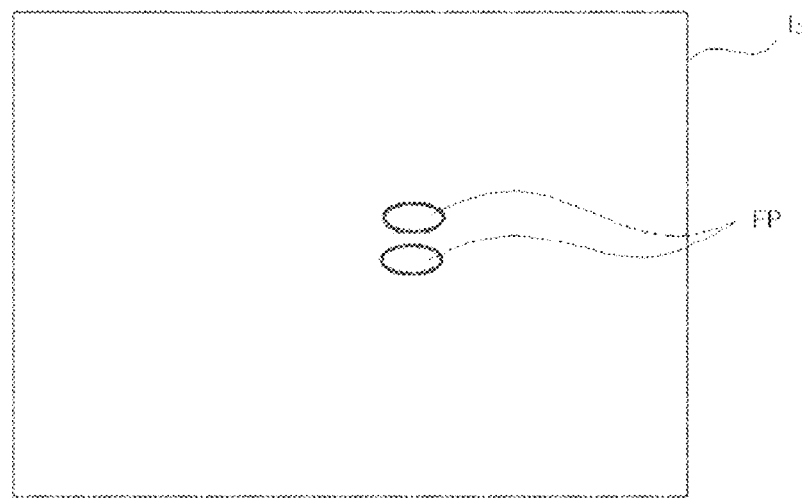

For example, in order to vividly display an edge region, the first mapping function generating module 231 may extract a pixel having a luminance value whose difference from that of an adjacent pixel is equal to or greater than a reference value from pixels included in the first region $R_1$. In other words, the first mapping function generating module 231 may extract a pixel FP having a luminance value whose difference from that of an adjacent pixel is equal to or greater than a reference value as illustrated in FIG. 10B from the image of the first region $R_1$ illustrated in FIG. 10A. Here, the pixel having a luminance value whose difference from that of an adjacent pixel is equal to or greater than the reference value may be determined as being positioned at the edge region of the image.

Also, the first mapping function generating module 231 may calculate a frequency distribution of pixels (the pixel having a luminance value whose difference from that of an adjacent pixel is equal to or greater than the reference value) positioned at the edge region.

Figure 11A:
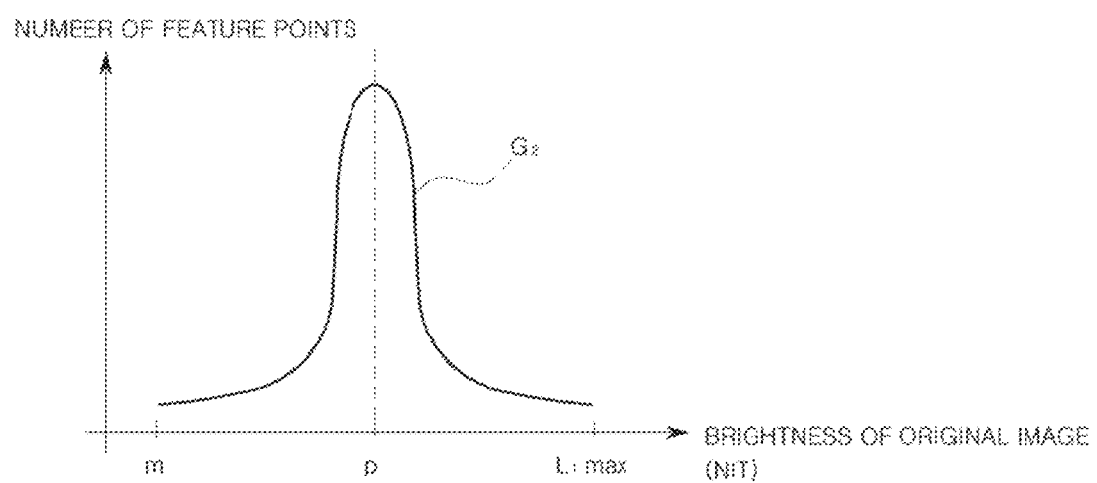
FIGS. 11A-11B illustrate an example in which the image processing unit illustrated in FIG. 3 generates a first mapping function based on a feature point of a first region.

The frequency distribution of pixels positioned at the edge region may be represented as an edge histogram $G_2$ as illustrated in FIG. 11A. Specifically, an x axis of the edge histogram $G_2$ represents a luminance value and a y axis represents the number of pixels having a luminance value whose difference from that of an adjacent pixel is equal to or greater than the reference value.

As illustrated in FIG. 11A, the number of pixels positioned at the edge region is the greatest near a luminance value p. In luminance values other than near the luminance value p, the number of pixels having a luminance value whose difference from that of an adjacent pixel is equal to or greater than the reference value is small.

In order to vividly display the edge region of the image displayed on the display device 100, the first mapping function generating module 231 may allocate a wide luminance range displayed on the display device 100 for a luminance range having the great number of edge region pixels and allocate a narrow luminance range displayed on the display device 100 for a luminance range having the small number of edge region pixels.

Figure 11B:
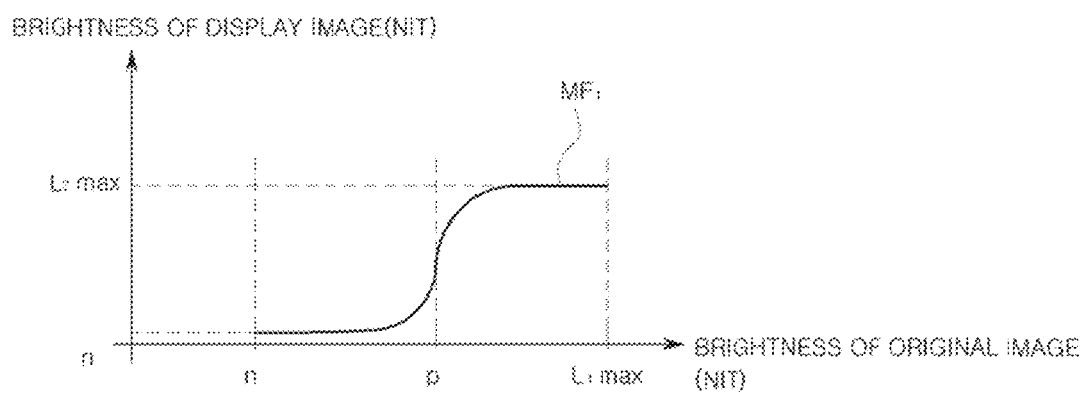

Specifically, the first mapping function generating module 231 may generate the first mapping function $MF_1$ in which luminance values at which the number of pixels positioned at the edge region is great have a large gradient and luminance values at which the number of pixels positioned at the edge region is small have a small gradient as illustrated in FIG. 11B. In particular, in order to generate the first mapping function $MF_1$, the first mapping function generating module 231 may determine a cumulative edge histogram obtained by integrating the edge histogram $G_2$ as the first mapping function $MF_1$.

However, the first mapping function $MF_1$ generated by the first mapping function generating module 231 is not limited thereto.

Figure 12A:
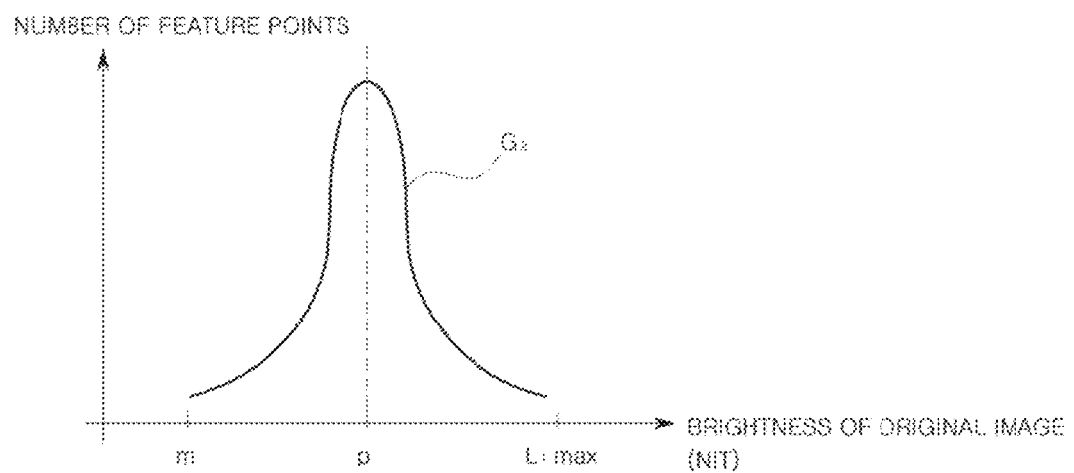
FIGS. 12A-12B illustrate another example in which the image processing unit illustrated in FIG. 3 generates a first mapping function according to a feature point of a first region.
Figure 12B:
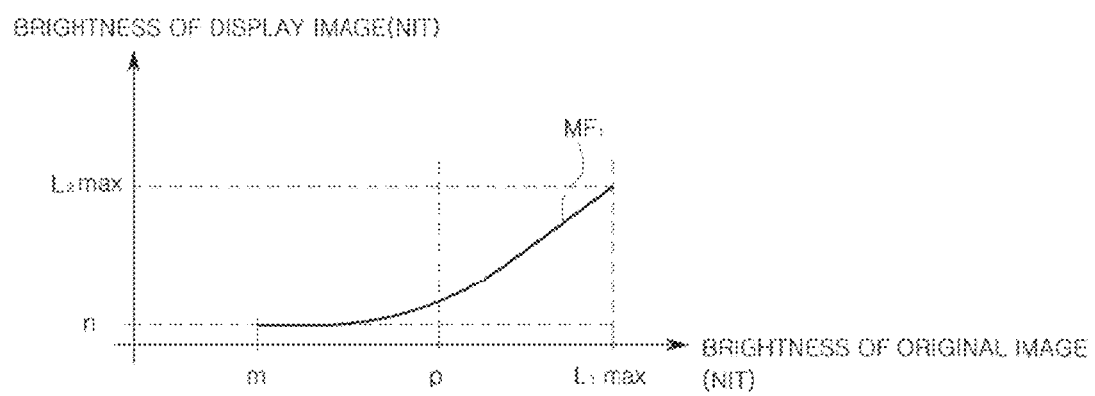

For example, when an edge histogram $G_1$ is the same as in FIG. 12A, the first mapping function generating module 231 may generate the first mapping function $MF_1$ as illustrated in FIG. 12B.

Specifically, the first mapping function generating module 231 may generate the first mapping function $MF_1$ that has a constant gradient above luminance values at which the number of pixels positioned at the edge region is great as illustrated in FIG. 12B.

As another example, in order to vividly display a texture of the image, the first mapping function generating module 231 may extract a pixel of a region in which a luminance value is changed within a constant range. The region in which a luminance value is changed within a constant range may be determined as a region in which a texture is exhibited.

Also, the first mapping function generating module 231 may calculate a frequency distribution of pixels of the region (a region in which a luminance value is changed within a constant range) in which a texture is exhibited Also, the first mapping function generating module 231 may generate a first mapping function in which a large gradient occurs near luminance values at which the number of pixels of the region in which a texture is exhibited is great and a small gradient occurs near luminance values at which the number of pixels of the region in which a texture is exhibited is small.

As another example, in order to vividly display a gradation of the image, the first mapping function generating module 231 may extract a pixel of a region in which a luminance value is constantly and continuously changed. The region in which a luminance value is constantly and continuously changed may be determined as a region in which a gradation is exhibited.

Also, the first mapping function generating module 231 may calculate a frequency distribution of pixels of the region (the region in which a luminance value is constantly and continuously changed) in which a gradation is exhibited.

Also, the first mapping function generating module 231 may generate a first mapping function in which luminance values at which the number of pixels of the region in which a gradation is exhibited is great have a large gradient and luminance values at which the number of pixels of the region in which a gradation is exhibited is small have a small gradient.

In this manner, the first mapping function generating module 231 may generate various first mapping functions $MF_1$ in order to vividly display various pieces of image information included in the image of the first region $R_1$.

Specifically, in order to vividly display various pieces of image information included in the image of the first region $R_1$, the first mapping function generating module 231 may calculate a frequency distribution of pixels including feature information and generate the first mapping function $MF_1$ based on the generated frequency distribution.

Next, the second mapping function generating module 232 will be described.

FIG. 13 illustrates an example in which the image processing unit illustrated in FIG. 3 generates a second mapping function based on an image of a second region.

As illustrated in FIG. 13, the second mapping function generating module 232 generates the second mapping function $MF_2$ based on the image of the second region $R_2$.

Here, the second mapping function $MF_2$ refers to a parameter function of converting the image of the second region $R_2$ within the original image $I_1$, which is the high dynamic range image, into the low dynamic range image. In other words, the image of the first region $R_1$ is converted into the low dynamic range image by the second mapping function $MF_2$.

Specifically, the first mapping function $MF_1$ converts the high dynamic range image whose luminance value ranges between a minimum original luminance value $L_1min$ and the reference luminance value m into the low dynamic range image whose luminance value ranges between a minimum display luminance value $L_2min$ and the second reference luminance value n. Here, the second reference luminance value n may be set by the user or may be appropriately set in advance by a designer of the display device 100, as described above.

Specifically, the second mapping function generating module 232 extracts luminance information of the second region $R_2$ and generates the second mapping function $MF_2$ based on the extracted luminance information.

Figure 13A:
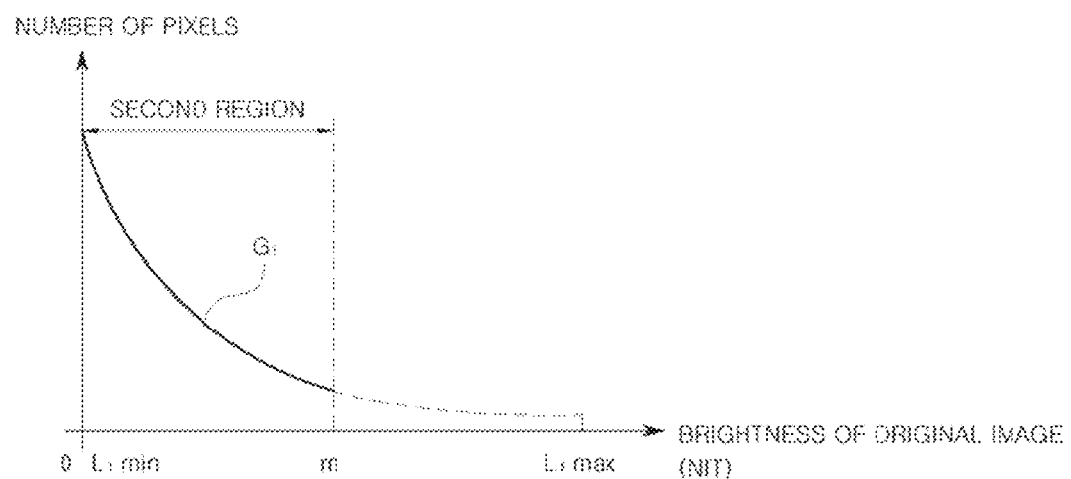
FIGS. 13A-13B illustrate an example in which the image processing unit illustrated in FIG. 3 generates a second mapping function based on an image of a second region.

The luminance information of the second region $R_2$ may be obtained based on the luminance histogram $G_1$ of the original image $I_1$ as illustrated in FIG. 13A.

The second mapping function generating module 232 may generate the second mapping function $MF_2$ for sufficiently maintaining brightness of the image of the second region $R_2$ and preventing image information included in the image of the second region $R_2$ from being lost.

For example, the second mapping function generating module 232 may allocate a wide luminance range displayed on the display device 100 for a luminance region having the great number of pixels and may allocate a narrow luminance range displayed on the display device 100 for a luminance region having the small number of pixels.

Figure 13B:
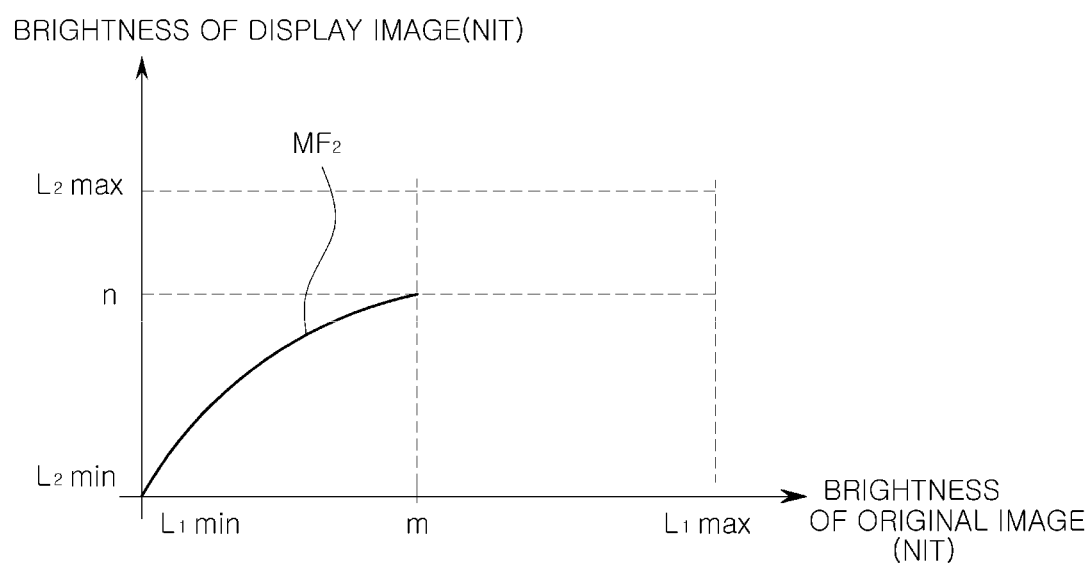

Specifically, as illustrated in FIG. 13A, when the number of pixels decreases as the luminance value increases, the second mapping function generating module 232 may generate the second mapping function $MF_2$ in which a gradient decreases as the luminance value increases as illustrated in FIG. 13B. In particular, in order to generate the second mapping function $MF_2$, the second mapping function generating module 232 may generate the second mapping function $MF_2$ based on a cumulative luminance histogram obtained by integrating the luminance histogram $G_1$.

However, the second mapping function $MF_2$ generated by the second mapping function generating module 232 is not limited thereto.

For example, the second mapping function generating module 232 may generate a linear tone mapping function, a log tone mapping function or the like.

The linear tone mapping function converts the high dynamic range image into the low dynamic range image such that a luminance value of the high dynamic range image and a luminance value of the low dynamic range image have a linear relation.

The linear tone mapping function, which is a tone mapping function of maintaining a contrast between pixels, has an advantage in that a visual sense of difference rarely occurs between the original image $I_1$ and the display image $I_2$.

The linear tone mapping function converts the high dynamic range image into the low dynamic range image such that a luminance value of the high dynamic range image and a luminance value of the low dynamic range image have a relation of a log function.

In the log tone mapping function, a characteristic in which human visual characteristics which underlie Weber's law increase similarly to a log function is used. Weber's law states that a human's eyes sense a slight change of brightness in a dark region, but cannot easily sense a great change of brightness in a bright region.

The log tone mapping function generally increases brightness of the image according to a characteristic of the log function and has a high contrast effect in a dark region of the image.

In this manner, the second mapping function generating module 232 may generate a second mapping function based on a log function or a second mapping function based on a zone system.

Next, the tone mapping module 240 will be described.

Figure 14:
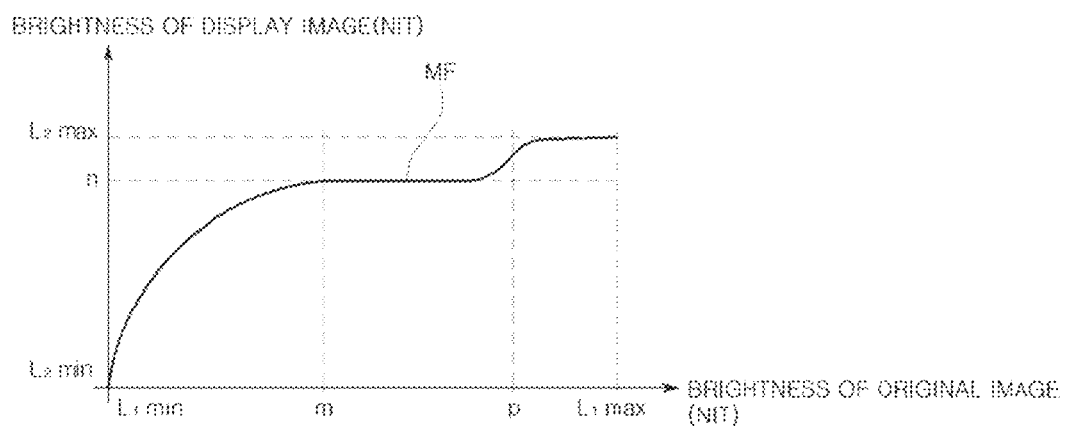
FIG. 14 illustrates an exemplary tone mapping function generated by the image processing unit illustrated in FIG. 3.

FIG. 14 illustrates an exemplary tone mapping function generated by the image processing unit illustrated in FIG. 3. FIG. 15 illustrates a result obtained when a display device of the related art performs tone mapping on a high dynamic image. FIG. 16 illustrates a result obtained when a display device according to an embodiment performs tone mapping on a high dynamic image.

As illustrated in FIGS. 14, 15 and 16, the tone mapping module 240 combines the first mapping function $MF_1$ with the second mapping function $MF_2$, generates a tone mapping function MF, and performs tone mapping on the original image $I_1$ using the tone mapping function MF.

Here, the tone mapping function MF refers to a parameter function of converting the original image $I_1$, which is the high dynamic range image, into the low dynamic range image. In other words, the original image $I_1$ is converted into the display image $I_2$, which is the low dynamic range image, according to the tone mapping function MF.

Specifically, the tone mapping function MF converts the original image $I_1$ whose luminance value ranges between the minimum original luminance value $L_1 min$ and the maximum original luminance value $L_1 max$ into the display image $I_2$ whose luminance value ranges between the minimum display luminance value $L_2 min$ and the maximum display luminance value $L_2 max$.

When the first mapping function $MF_1$ illustrated in FIG. 11B and the second mapping function $MF_2$ illustrated in FIG. 13B are combined, the tone mapping function MF according to an embodiment illustrated in FIG. 14 is generated.

The tone mapping function MF generated in this manner may preserve brightness of the image of the second region $R_2$, which is a low luminance region, and preserve feature information of the image of the first region $R_1$, which is a high luminance region.

The tone mapping module 240 may perform tone mapping on the original image and generate the first image $I_2$. Specifically, the tone mapping module 240 may apply all pixels included in the original image $I_1$ to the tone mapping function MF and thus perform tone mapping.

Here, the first image $I_2$ has a luminance range that is the same as a luminance range that can be output from the display device 100.

In this manner, the tone mapping function MF generated by the tone mapping module 240 that can preserve brightness of the low luminance region and feature information of the high luminance region can more vividly display an image in the high luminance region than a tone mapping function $MF_3$ based on a log function.

Figure 15A:
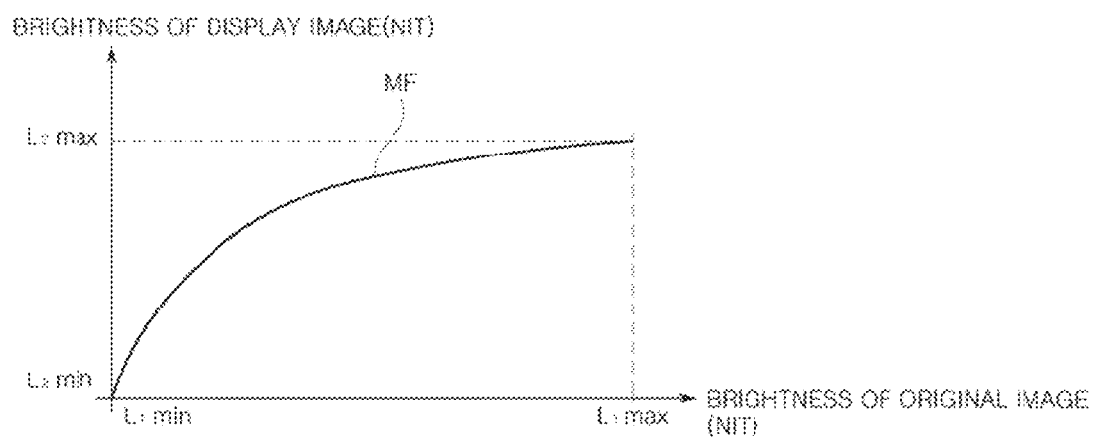
FIGS. 15A-15B illustrate a result obtained when a display device of the related art performs tone mapping on a high dynamic image.
Figure 15B:
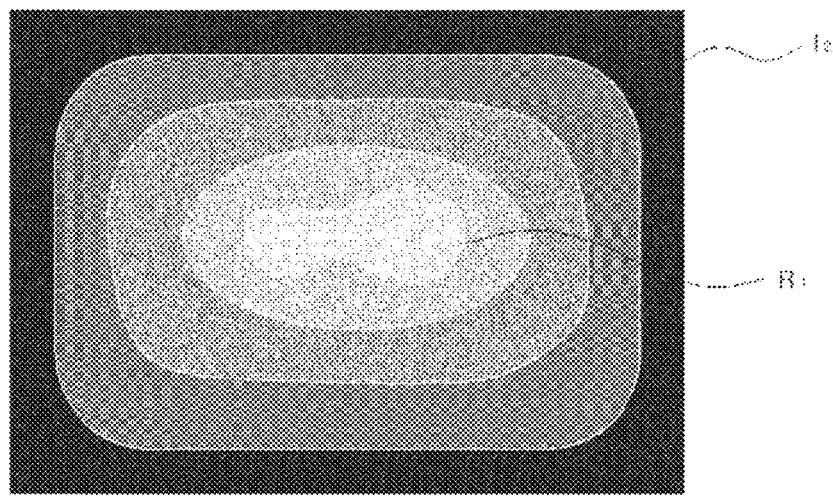

For example, when the tone mapping function $MF_3$ based on a log function illustrated in FIG. 15A is used to perform tone mapping on the original image $I_1$ illustrated in FIG. 5, the display image $I_2$ illustrated in FIG. 15B is output.

Figure 16A:
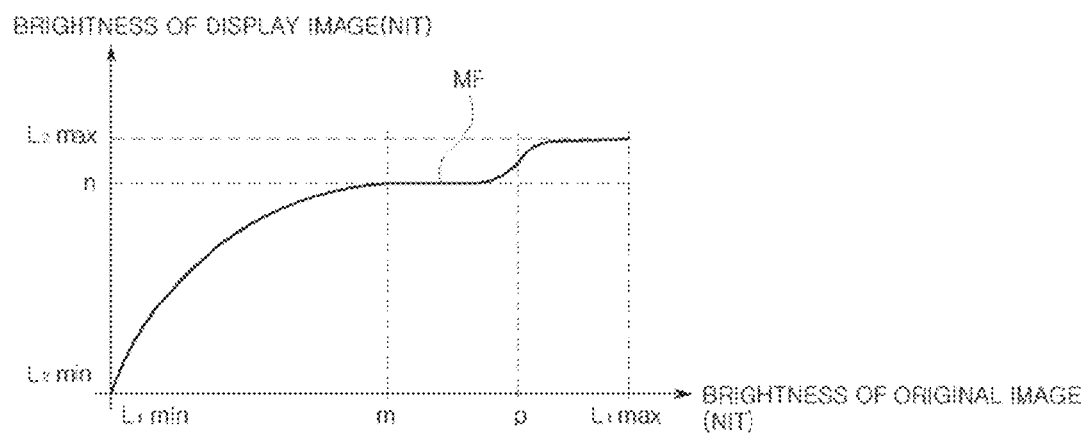
FIGS. 16A-16B illustrate a result obtained when a display device according to an embodiment performs tone mapping on a high dynamic image.
Figure 16B:
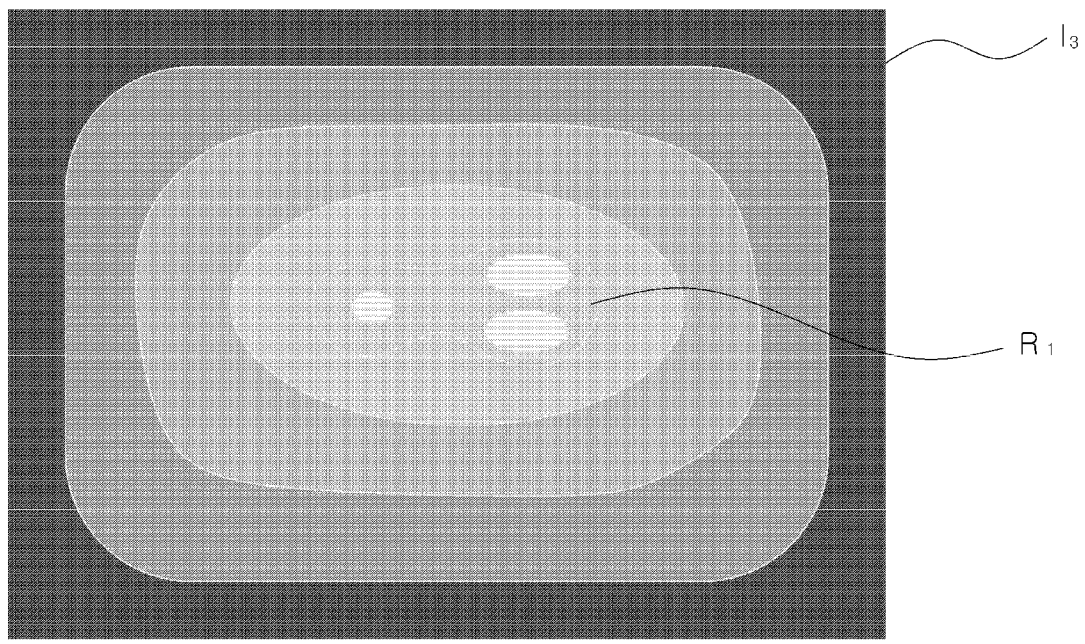

Also, when the tone mapping function MF illustrated in FIG. 16A is used to perform tone mapping on the original image $I_1$ illustrated in FIG. 5, the display image $I_2$ illustrated in FIG. 16B is output.

In the display image $I_2$ on which tone mapping is performed by the tone mapping function $MF_3$ based on a log function, the image is not vividly displayed in a high luminance region $R_1$ as illustrated in FIG. 15B. On the other hand, in the display image $I_2$ on which tone mapping is performed by the tone mapping function MF generated by the tone mapping module 240, the image is vividly displayed in a high luminance region $R_1$ as illustrated in FIG. 16B.

Next, the detail enhancement module 250 will be described.

Detail enhancement refers to processing of the image $I_2$ on which tone mapping is performed in order to provide a further vivid image for the user.

Such detail enhancement may include various image processing techniques such as contrast enhancement through which a difference between a bright region and a dark region of an image is maximized, histogram equalization through which a histogram is regulated to change an image having a low contrast distribution to an image having a uniform contrast distribution, image sharpening through which an image is finely converted, and image smoothing through which an image is gently converted.

The detail enhancement module 250 may process the first image $I_2$ using various image processing techniques which are already well-known, and output the second image $I_3$ on which detail enhancement is performed.

In this manner, the image processing unit 200 may partition the original image $I_1$ into the first region $R_1$, which is a high luminance region, and the second region $R_2$, which is a low luminance region, perform tone mapping on the first region $R_1$ based on characteristics of the image such as an edge of the image, a texture of the image or a gradation of the image and perform tone mapping on the second region $R_2$ based on brightness of the image.

As a result, the image processing unit 200 may process the original image $I_1$ such that the original image $I_1$, which is the high dynamic range image, is vividly displayed on the display panel 143 having a low dynamic range.

Hereinafter, operations of the display device 100 according to an embodiment will be described.

Figure 17:
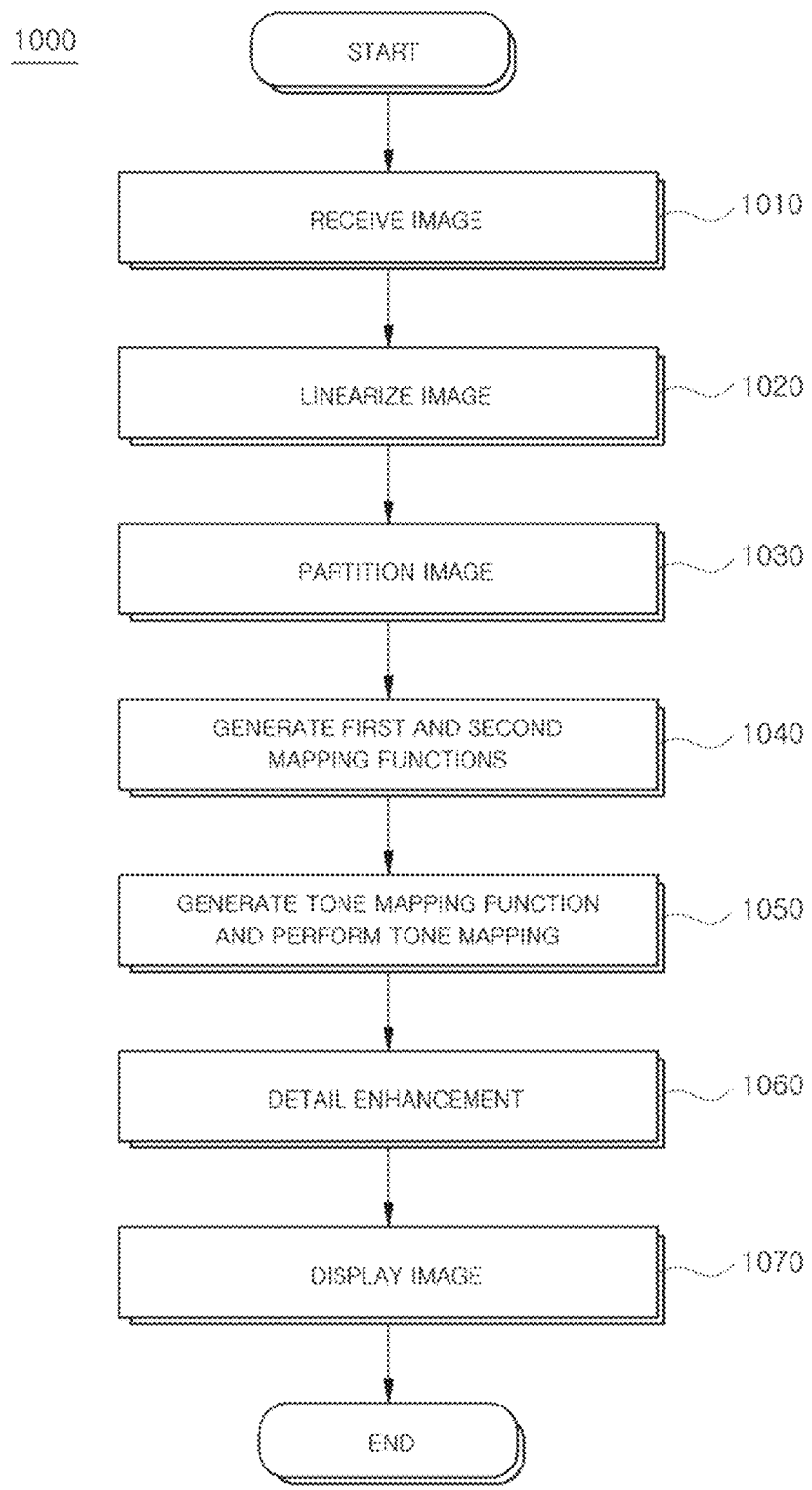
FIG. 17 illustrates an exemplary high dynamic range image display operation of a display device according to an embodiment.

FIG. 17 illustrates an exemplary high dynamic range image display operation of a display device according to an embodiment;

As illustrated in FIG. 17, the high dynamic range image display operation (1000) of the display device 100 will be described.

The display device 100 receives an image from the outside (1010). The display device 100 may receive content from the outside through the content receiving unit 130 and extract the image data ID and the metadata MD included in the received content.

The metadata MD is data including information on the image data ID, and may include luminance information of units of scenes or luminance information of units of frames. Specifically, the metadata MD may include a maximum luminance value, a minimum luminance value and an average luminance value of the entire content C, a maximum luminance value, a minimum luminance value and an average luminance value of an image included in each scene or a maximum luminance value, a minimum luminance value and an average luminance value of an image forming each frame.

The image data ID and the metadata MD are extracted, and then the display device 100 linearizes the received image (1020). The display device 100 may linearize image data in order to obtain the original image $I_1$.

Specifically, the image processing unit 200 of the display device 100 may use the second non-linear mapping function $F_2$ and restore the image data to the original image $I_1$. Also, the image processing unit 200 may calculate the luminance information of the original image $I_1$ based on a color value of each of the pixels included in the restored original image $I_1$.

The image is linearized and then the display device 100 partitions the original image $I_1$ into a plurality of regions (1030). The display device 100 may partition the original image $I_1$ into the first region $R_1$, which is a high luminance region, and the second region $R_2$, which is a low luminance region.

Specifically, the image processing unit 200 of the display device 100 may partition the original image $I_1$ into the first region $R_1$ including a pixel whose luminance value is equal to or greater than the reference luminance value and the second region $R_2$ including a pixel whose luminance value is less than the reference luminance value m.

The image is partitioned and then the display device 100 generates the first mapping function $MF_1$ and the second mapping function $MF_2$ (1040). The display device 100 may generate the first mapping function $MF_1$ of the image of the first region $R_1$ and the second mapping function $MF_2$ of the image of the second region $R_2$.

Specifically, the image processing unit 200 of the display device 100 may extract a pixel including feature information such as an edge, a texture and a gradation from the image of the first region $R_1$ and generate the first mapping function $MF_1$ based on a histogram of the pixels including feature information.

Also, the image processing unit 200 may generate the second mapping function $MF_2$ based on the luminance histogram of the image of the second region $R_2$.

After the first and second mapping functions $MF_1$ and $MF_2$ are generated, the display device 100 generates the tone mapping function and performs tone mapping on the original image $I_1$ (1050). The display device 100 may use the tone mapping function MF in which the first and second mapping functions $MF_1$ and $MF_2$ are combined and generate the first image $I_2$ from the original image $I_1$.

Specifically, the image processing unit 200 of the display device 100 may combine the first mapping function $MF_1$ with the second mapping function $MF_2$ and generate the tone mapping function MF. Also, the image processing unit 200 may apply the original image $I_1$ to the tone mapping function MF and generate the first image $I_2$ from the original image $I_1$.

The tone mapping is performed and then the display device 100 performs detail enhancement on the first image $I_2$ (1060). The display device 100 may perform image processing such as contrast enhancement on the first image $I_2$ in order to further vividly display the first image $I_2$.

Specifically, the image processing unit 200 of the display device 100 may perform detail enhancement such as contrast enhancement on the first image $I_2$ and thus generate the second image $I_3$.

The detail enhancement is performed and then the display device 100 displays the image (1070). The display device 100 may display the second image $I_3$ through the display unit 140.

In this manner, the display device 100 may partition the original image $I_1$ into the first region $R_1$, which is a high luminance region, and the second region $R_2$, which is a low luminance region, perform tone mapping based on characteristics of the image such as an edge, a texture or a gradation of the image on the first region $R_1$, and perform tone mapping on the second region $R_2$ based on brightness of the image.

As a result, the display device 100 may process the original image $I_1$ such that the original image $I_1$, which is the high dynamic range image, is vividly displayed on the display panel 143 having a low dynamic range.

The display device 100 according to the embodiment and an exemplary configuration and operation of the image processing unit 200 included therein have been described above.

However, an image processing unit included in the display device 100 is not limited to the image processing unit 200 illustrated in FIG. 3, but various display devices 100 may include various image processing units.

Hereinafter, various image processing units that can be included in the display device 100 according to the embodiment will be described. The same configurations as those of the image processing unit 200 described above are denoted with like reference numerals.

Figure 18:
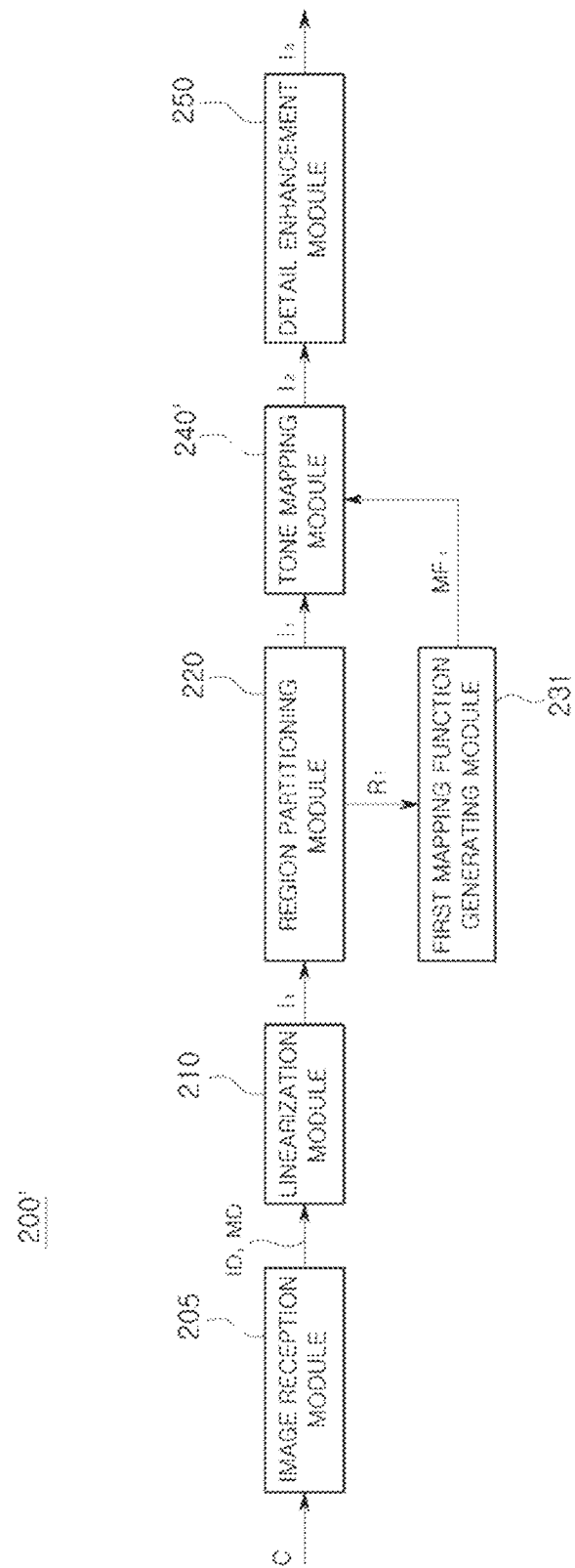
FIG. 18 illustrates another exemplary image processing unit included in a display device according to an embodiment.

FIG. 18 illustrates another exemplary image processing unit included in a display device according to an embodiment. FIGS. 19 and 20 illustrate an example in which the image processing unit illustrated in FIG. 18 generates a tone mapping function.

As illustrated in FIG. 18, an image processing unit 200' may include the image reception module 205 configured to receive the image data ID and the metadata MD, the linearization module 210 configured to linearize the image data, the region partitioning module 220 configured to partition an image based on a luminance, the first mapping function generating module 231 configured to generate the tone mapping function of the high luminance region, a tone mapping module 240' configured to perform tone mapping, and the detail enhancement module 250 configured to perform a post-processing operation on the image on which tone mapping is performed.

The image reception module 205 extracts the image data ID and the metadata MD from the content C received by the content receiving unit 130. Here, the content C includes the image data ID representing the original image and the metadata MD related to the image data ID. The metadata MD may include luminance information of the image data ID. When the content C is, for example, a video, the metadata MD may include at least one of luminance information of the entire content C, luminance information of each scene included in the content C, and luminance information of each frame included in the content C.

The linearization module 210 may linearize the image data ID received from the image reception module 205 and analyze a luminance of the linearized image. Specifically, when the maximum luminance value $L_1$max, the minimum luminance value $L_1$min or the average luminance value is not included in the metadata MD of the content C, the linearization module 210 may directly calculate the maximum luminance value $L_1$max, the minimum luminance value $L_1$min and the average luminance value from the linearized original image.

The region partitioning module 220 partitions the original image into the first region $R_1$ and the second region $R_2$ based on the first reference luminance value m according to luminances of the plurality of pixels. Specifically, the region partitioning module 220 may partition the original image into a first region including pixels whose luminances are equal to or greater than the reference luminance value m, and a second region including pixels whose luminances are less than the first reference luminance value m.

The first mapping function generating module 231 extracts pixels including feature information from the first region $R_1$ and generates the first mapping function $MF_1$ based on a histogram of the extracted pixels. Here, the feature information may include edge information of the image included in the first region $R_1$, texture information of the image and gradation information of the image.

The tone mapping module 240' generates the tone mapping function MF based on the original image $I_1$ and the first mapping function $MF_1$ and performs tone mapping on the original image $I_1$ using the tone mapping function MF.

Here, the tone mapping function MF refers to a parameter function of converting the original image $I_1$, which is the high dynamic range image, into the low dynamic range image. In other words, the original image $I_1$ is converted into the display image $I_2$, which is the low dynamic range image, by the tone mapping function MF.

First, the tone mapping module 240' generates a temporary tone mapping function MF' based on the luminance information of the original image $I_1$. Here, the temporary tone mapping function MF' may be used to finally generate the tone mapping function MF.

Figure 19A:
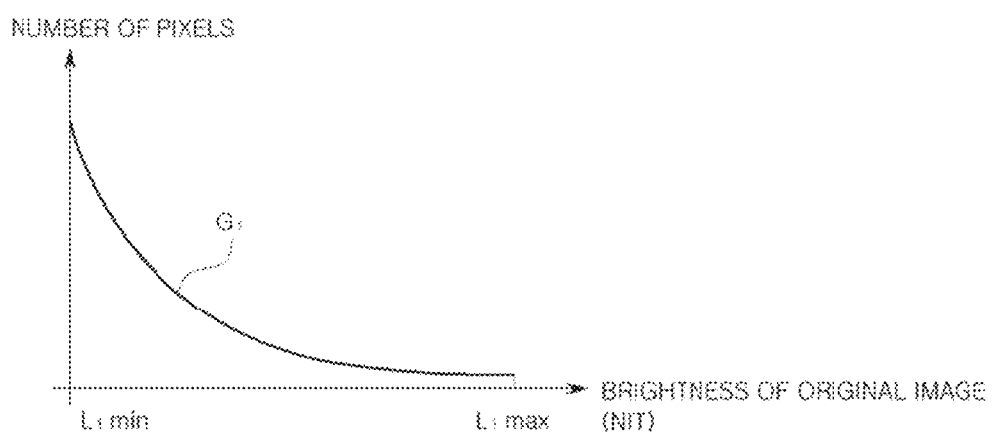
FIGS. 19A-19B and 20 illustrate an example in which the image processing unit illustrated in FIG. 18 generates a tone mapping function.
Figure 20:
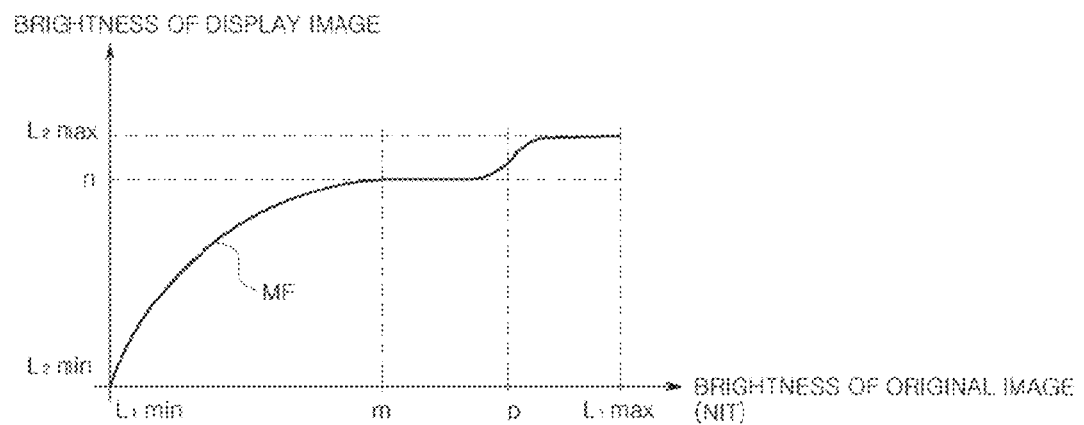

The luminance information of the original image $I_1$ may be obtained based on the luminance histogram $G_1$ of the original image $I_1$ as illustrated in FIG. 19A.

The tone mapping module 240' may generate the temporary tone mapping function MF' for sufficiently maintaining brightness of the original image $I_1$ and preventing image information included in the original image $I_1$ from being lost.

For example, the tone mapping module 240' may allocate a wide luminance range displayed on the display device 100 for a luminance region having the great number of pixels and may allocate a narrow luminance range displayed on the display device 100 for a luminance region having the small number of pixels.

Figure 19B:
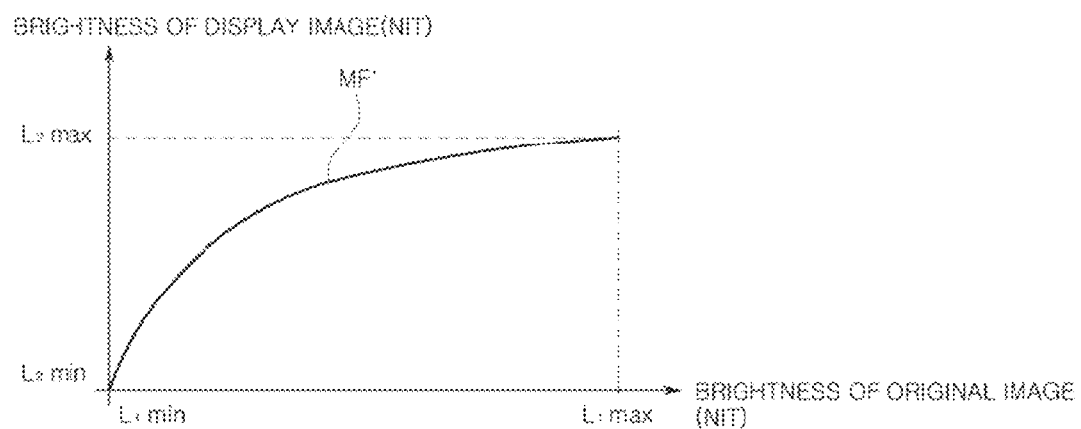

Specifically, as illustrated in FIG. 19A, when the number of pixels decreases as the luminance value increases, the tone mapping module 240' may generate the temporary tone mapping function MF' in which a gradient decreases as the luminance value increases as illustrated in FIG. 19B. In particular, in order to generate the temporary tone mapping function MF,' the tone mapping module 240' may determine a cumulative luminance histogram obtained by integrating the luminance histogram $G_1$ as the temporary tone mapping function MF.'

However, the temporary tone mapping function MF' generated by the tone mapping module 240' is not limited thereto.

For example, the tone mapping module 240' may generate a tone mapping function based on a log function or a tone mapping function based on a zone system, which is already well-known.

The tone mapping module 240' that has generated the temporary tone mapping function MF' combines the temporary tone mapping function MF' with the first mapping function $MF_1$ received from the first mapping function generating module 231 and generates the tone mapping function MF.

The tone mapping module 240' may combine the temporary tone mapping function MF' with the first mapping function $MF_1$ using various methods.

For example, the tone mapping module 240' may synthesize the temporary tone mapping function MF' of the high luminance region and the first mapping function $MF_1$ and generate the tone mapping function MF.

Specifically, the tone mapping module 240' may perform normalization such that an output of the first mapping function $MF_1$ has a value between "0" and "1," synthesize the temporary tone mapping function MF' of the reference luminance value m or more and the normalized first mapping function $MF_1$, and thus generate the tone mapping function MF.

As a result, tone mapping is performed on the original image $I_1$ by the temporary tone mapping function MF' and tone mapping may be performed again on the image included in the first region $R_1$ within the original image $I_1$ by the first mapping function $MF_1$.

As another example, the tone mapping module 240' may replace the temporary tone mapping function MF' of the high luminance region with the first mapping function $MF_1$. Specifically, the tone mapping module 240' may replace a part of the reference luminance value m or more within the temporary tone mapping function MF' with the first mapping function $MF_1$.

In this case, the tone mapping module 240' may calculate a luminance value I of the low dynamic range corresponding to the reference luminance value m and scale an output range of the first mapping function $MF_1$ based on a difference between the calculated reference luminance value I of the low dynamic range and the maximum luminance value $L_2max$ of the low dynamic range. Specifically, the tone mapping module 240' may scale the output range of the first mapping function $MF_1$ such that the output of the first mapping function $MF_1$ ranges between the reference luminance value I of the low dynamic range and the maximum luminance value $L_2max$ of the low dynamic range.

When the temporary tone mapping function MF' illustrated in FIG. 19B and the first mapping function $MF_1$ illustrated in FIG. 11B are combined, the tone mapping function MF illustrated in FIG. 20 may be generated.

The tone mapping function MF generated in this manner may preserve brightness of the original image $I_1$ and preserve feature information of the image of the first region $R_1$, which is a high luminance region.

The tone mapping module 240' that has generated the tone mapping function MF may perform tone mapping on the original image $I_1$ using the tone mapping function MF and generate the first image $I_2$. Specifically, the tone mapping module 240' may apply all pixels included in the original image $I_1$ to the tone mapping function MF and thus perform tone mapping.

Here, the first image $I_2$ has a luminance range that is the same as a luminance range that can be output from the display device 100.

In this manner, the tone mapping function MF generated by the tone mapping module 240' that can preserve brightness of the low luminance region and feature information of the high luminance region can more vividly display an image in the high luminance region than the tone mapping function based on a log function.

The detail enhancement module 250 processes the image $I_2$ on which tone mapping is performed in order to provide a further vivid image for the user. Here, detail enhancement may include various image processing techniques such as contrast enhancement through which a difference between a bright region and a dark region of an image is maximized, histogram equalization through which a histogram is regulated to change an image having a low contrast distribution to an image having a uniform contrast distribution, image sharpening through which an image is finely converted, and image smoothing through which an image is gently converted.

Hereinafter, operations of the display device 100 according to an embodiment will be described.

Figure 21:
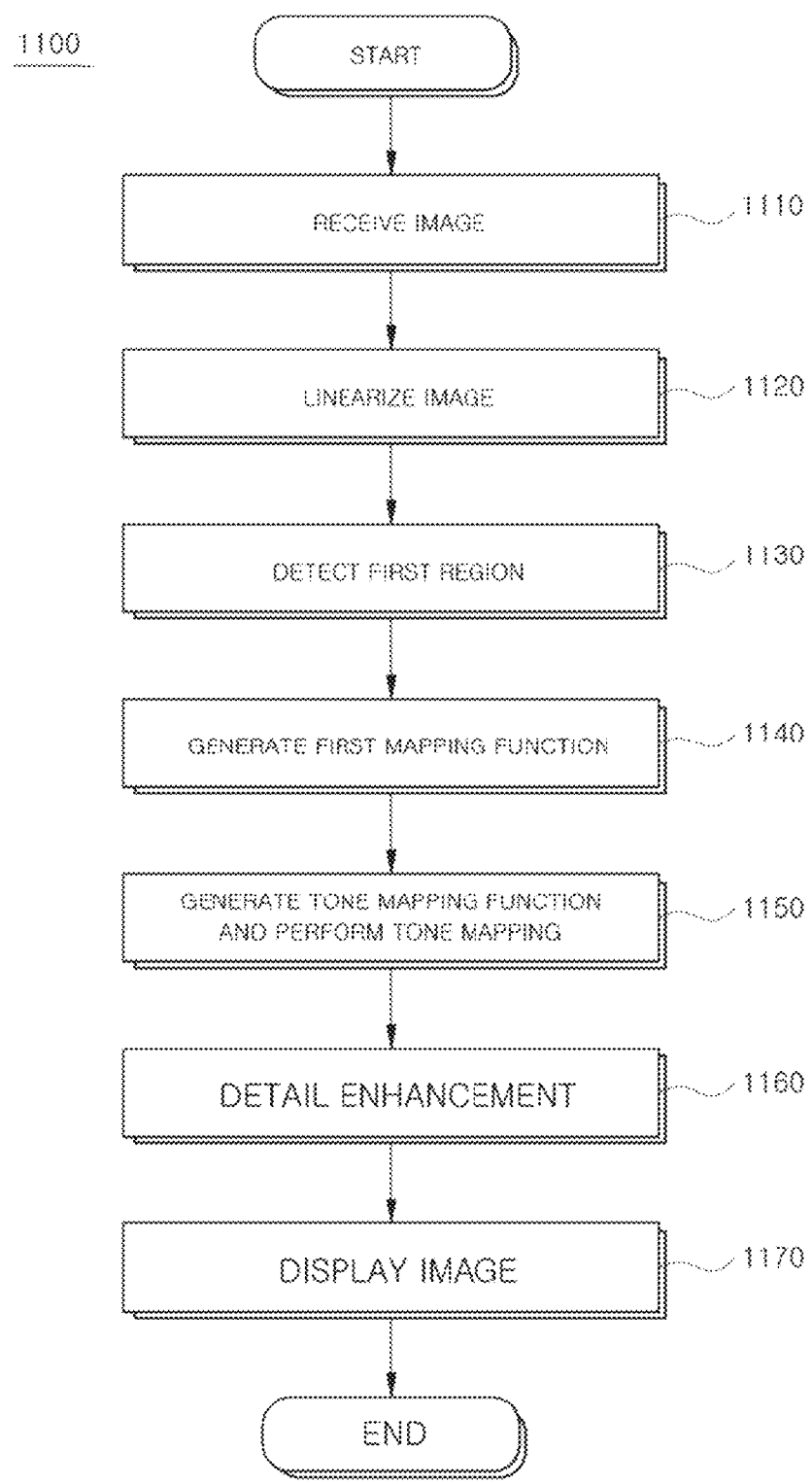
FIG. 21 illustrates another exemplary high dynamic range image display operation of a display device according to an embodiment.

FIG. 21 illustrates another exemplary high dynamic range image display operation of a display device according to an embodiment.

As illustrated in FIG. 21, the high dynamic range image display operation (1100) of the display device 100 will be described.

The display device 100 receives an image from the outside (1110). The display device 100 may receive content from the outside through the content receiving unit 130 and extract the image data ID and the metadata MD included in the received content.

The metadata MD is data including information on the image data ID, and may include luminance information of units of scenes or luminance information of units of frames. Specifically, the metadata MD may include a maximum luminance value, a minimum luminance value and an average luminance value of the entire content C, a maximum luminance value, a minimum luminance value and an average luminance value of an image included in each scene or a maximum luminance value, a minimum luminance value and an average luminance value of an image forming each frame.

The image data ID and the metadata MD are extracted, and then the display device 100 linearizes the received image (1120). The display device 100 may linearize image data in order to obtain the original image $I_1$.

Specifically, the image processing unit 200 of the display device 100 may use the second non-linear mapping function $F_2$ and restore the image data to the original image $I_1$. Also, the image processing unit 200 may calculate the luminance information of the original image $I_1$ based on a color value of each of the pixels included in the restored original image $I_1$.

The image is linearized and then the display device 100 detects the first region from the original image $I_1$ (1130). The display device 100 may detect the first region $R_1$, which is a high luminance region, from the original image $I_1$.

Specifically, the image processing unit 200 of the display device 100 may detect the first region $R_1$ including a pixel whose luminance value is equal to or greater than the reference luminance value m from the original image $I_1$.

The first region $R_1$ is detected and then the display device 100 generates the first mapping function $MF_1$ (1140). The display device 100 may generate the first mapping function $MF_1$ of the image of the first region $R_1$.

Specifically, the image processing unit 200 of the display device 100 may extract a pixel including feature information such as an edge, a texture and a gradation from the image of the first region $R_1$ and generate the first mapping function $MF_1$ based on a histogram of the pixels including feature information.

After the first mapping function $MF_1$ is generated, the display device 100 generates the tone mapping function and performs tone mapping on the original image $I_1$ (1150). The display device 100 may generate the temporary tone mapping function MF' and generate the first image $I_2$ from the original image $I_1$ using the temporary tone mapping function MF' and the first mapping function $MF_1$.

Specifically, the image processing unit 200 of the display device 100 may generate the temporary tone mapping function MF' based on the luminance histogram of the original image $I_1$, combine the temporary tone mapping function MF' with the first mapping function $MF_1$ and generate the tone mapping function MF.

Also, the image processing unit 200 may apply the original image $I_1$ to the tone mapping function MF and thus generate the first image $I_2$ from the original image $I_1$.

The tone mapping is performed and then the display device 100 performs detail enhancement on the first image $I_2$ (1160). The display device 100 may perform image processing such as contrast enhancement on the first image $I_2$ in order to further vividly display the first image $I_2$.

Specifically, the image processing unit 200 of the display device 100 may perform detail enhancement such as contrast enhancement on the first image $I_2$ and thus generate the second image $I_3$.

The detail enhancement is performed and then the display device 100 displays the image (1170). The display device 100 may display the second image $I_3$ through the display unit 140.

In this manner, the display device 100 may detect the first region $R_1$ from the original image $I_1$, perform tone mapping on the original image $I_1$ based on brightness of the image and then perform tone mapping on the first region $R_1$ based on characteristics of the image such as an edge, a texture or a gradation.

As a result, the display device 100 may process the original image $I_1$ such that the original image $I_1$, which is the high dynamic range image, is vividly displayed on the display panel 143 having a low dynamic range.

Figure 22:
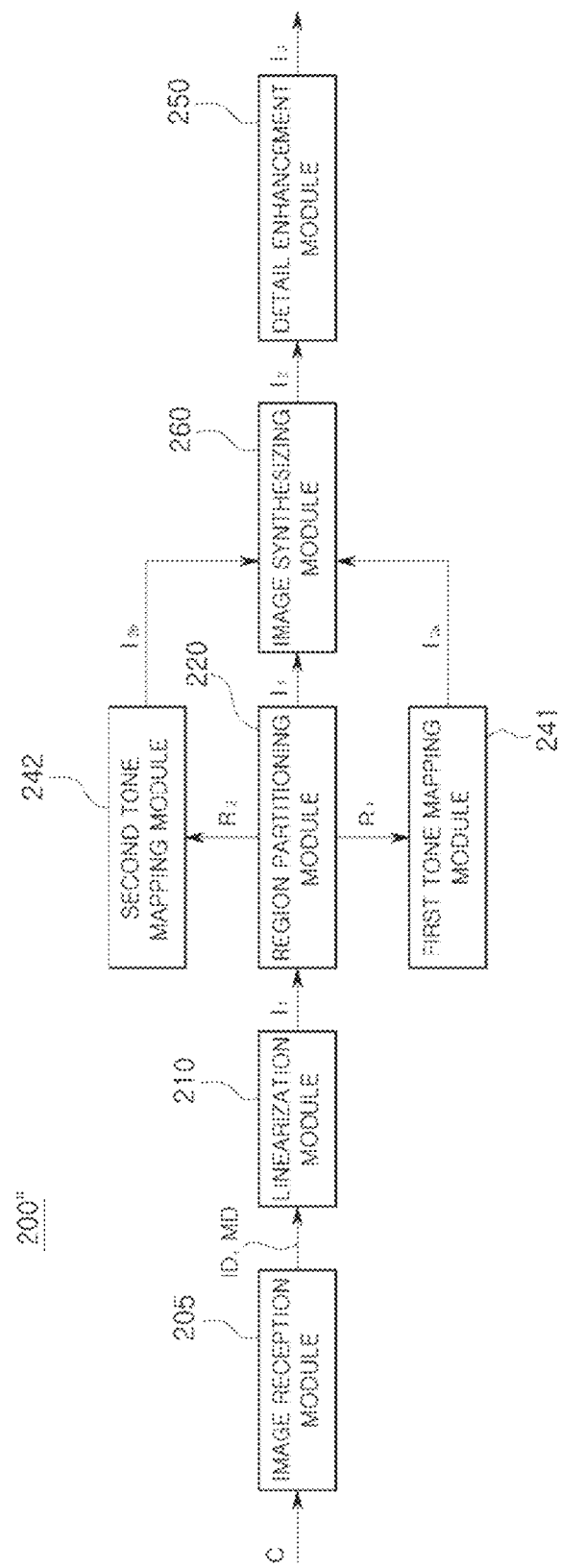
FIG. 22 illustrates another exemplary image processing unit included in a display device according to an embodiment.

FIG. 22 illustrates another exemplary image processing unit included in a display device according to an embodiment. Also, FIG. 23 illustrates an example in which the image processing unit illustrated in FIG. 22 performs tone mapping on an image of a first region. FIG. 24 illustrates an example in which the image processing unit illustrated in FIG. 22 performs tone mapping on an image of a second region. Also, FIG. 25 illustrates another exemplary high dynamic range image display operation of a display device according to an embodiment.

As illustrated in FIG. 22, an image processing unit 200" may include the image reception module 205 configured to receive the image data ID and the metadata MD, the linearization module 210 configured to linearize the image data, the region partitioning module 220 configured to partition an image according to a luminance, a first tone mapping module 241 configured to perform tone mapping on the high luminance region, a second tone mapping module 242 configured to perform tone mapping on the low luminance region, an image synthesizing module 260 configured to synthesize the image on which tone mapping is performed, and the detail enhancement module 250 configured to perform a post-processing operation on the image.

The image reception module 205 extracts the image data ID and the metadata MD from the content C received by the content receiving unit 130. Here, the content C includes the image data ID representing the original image and the metadata MD related to the image data ID. The metadata MD may include luminance information of the image data ID. When the content C is, for example, a video, the metadata MD may include at least one of luminance information of the entire content C, luminance information of each scene included in the content C, and luminance information of each frame included in the content C.

The linearization module 210 may linearize the image data ID received from the image reception module 205 and analyze a luminance of the linearized image. Specifically, when the maximum luminance value $L_1max$, the minimum luminance value $L_1min$ or the average luminance value is not included in the metadata MD of the content C, the linearization module 210 may directly calculate the maximum luminance value $L_1max$, the minimum luminance value $L_1min$ and the average luminance value from the linearized original image.

The region partitioning module 220 partitions the original image into the first region $R_1$ and the second region $R_2$ based on the first reference luminance value m according to luminances of the plurality of pixels. Specifically, the region partitioning module 220 may partition the original image into a first region including pixels whose luminances are equal to or greater than the reference luminance value m, and a second region including pixels whose luminances are less than the first reference luminance value m.

The first tone mapping module 241 generates the first mapping function $MF_1$ based on the image of the first region $R_1$, and performs tone mapping on the image of the first region $R_1$ using the first mapping function $MF_1$.

Here, the first mapping function $MF_1$ refers to a parameter function of converting the image of the first region $R_1$, which is the high dynamic range image, into the low dynamic range image. In other words, the image of the first region $R_1$ is converted into the low dynamic range image by the first mapping function $MF_1$.

Specifically, the first mapping function $MF_1$ converts the high dynamic range image whose luminance value ranges between the first reference luminance value m and the maximum original luminance value $L_1max$ into the low dynamic range image whose luminance value ranges between the second reference luminance value n and the maximum display luminance value $L_2max$.

The first tone mapping module 241 extracts pixels including feature information and generates the first mapping function $MF_1$ based on a histogram of the extracted pixels. Here, the feature information may include edge information of the image included in the first region $R_1$, texture information of the image and gradation information of the image.

For example, in order to vividly display an edge region, the first tone mapping module 241 may extract a pixel having a luminance value whose difference from that of an adjacent pixel is equal to or greater than a reference value from pixels included in the first region $R_1$ and generate the first mapping function $MF_1$ based on a histogram of the extracted pixels.

Also, the first tone mapping module 241 performs tone mapping on the image of the first region $R_1$ according to the first mapping function $MF_1$ and generates a first region display image $I_{2a}$.

Figure 23A:
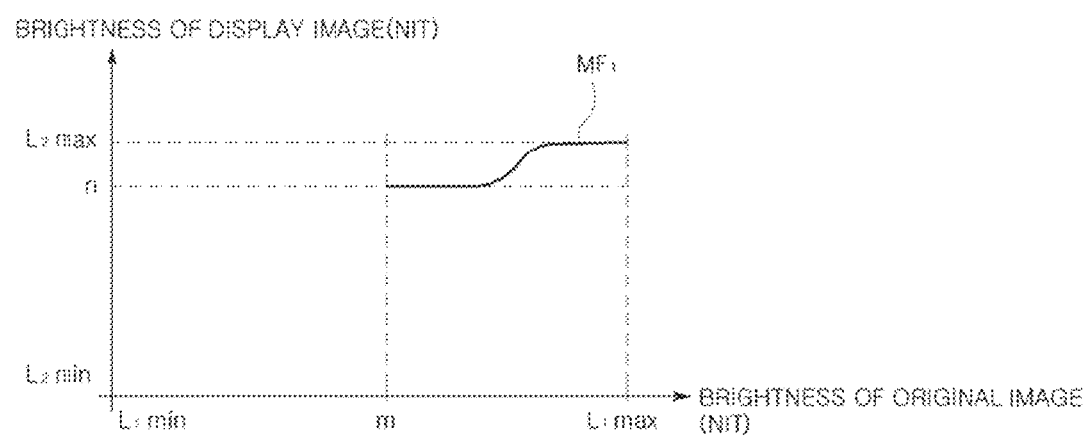
FIGS. 23A-23B illustrate an example in which the image processing unit illustrated in FIG. 22 performs tone mapping on an image of a first region.
Figure 23B:
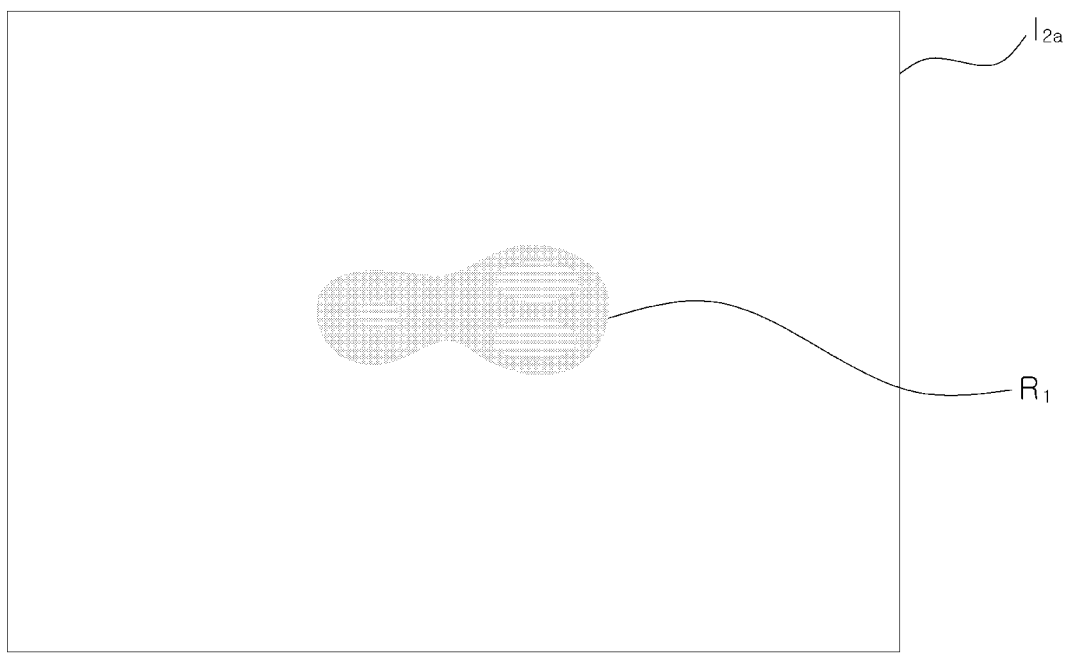

For example, the first tone mapping module 241 may perform tone mapping on the image of the first region $R_1$ illustrated in FIG. 8 using the first mapping function $MF_1$ illustrated in FIG. 23A and output the first region display image $I_{2a}$ as illustrated in FIG. 23B.

The second tone mapping module 242 generates the second mapping function $MF_2$ based on the image of the second region $R_2$ and performs tone mapping on the image of the second region $R_2$ using the second mapping function $MF_2$.

Here, the second mapping function $MF_2$ refers to a parameter function of converting the image of the second region $R_2$, which is the high dynamic range image, into the low dynamic range image. In other words, the image of the second region $R_2$ is converted into the low dynamic range image by the second mapping function $MF_2$.

Specifically, the second mapping function $MF_2$ converts the high dynamic range image whose luminance value ranges between the minimum original luminance value $L_1min$ and the first reference luminance value m into the low dynamic range image whose luminance value ranges between the minimum display luminance value $L_2min$ and the second reference luminance value n.

The second tone mapping module 242 generates the second mapping function $MF_2$ based on a luminance histogram of the image of the second region $R_2$. Specifically, the second tone mapping module 242 may generate the second mapping function $MF_2$ based on a cumulative luminance histogram obtained by integrating the luminance histogram of the image of the second region $R_2$.

However, the present embodiment is not limited thereto. The second tone mapping module 242 may generate the second mapping function $MF_2$ based on a linear function, a log function or the like.

Also, the second tone mapping module 242 performs tone mapping on the image of the second region $R_2$ according to the second mapping function $MF_2$ and generates a second region display image $I_{2b}$.

Figure 24A:
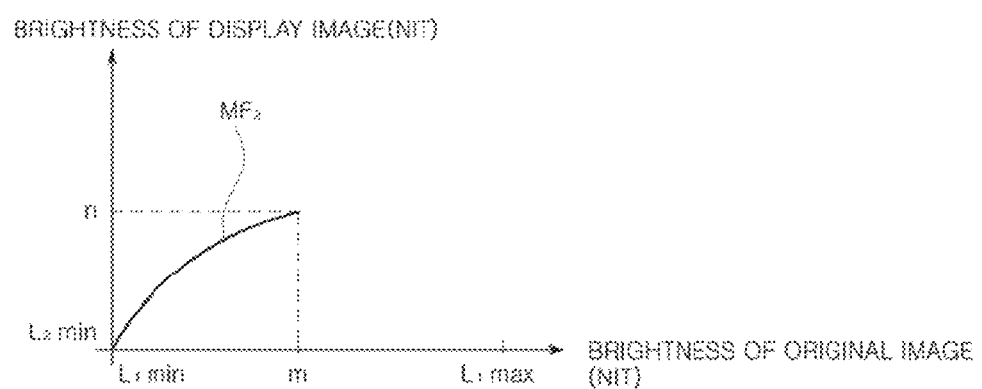
FIGS. 24A-24B illustrate an example in which the image processing unit illustrated in FIG. 22 performs tone mapping on an image of a second region.
Figure 24B:
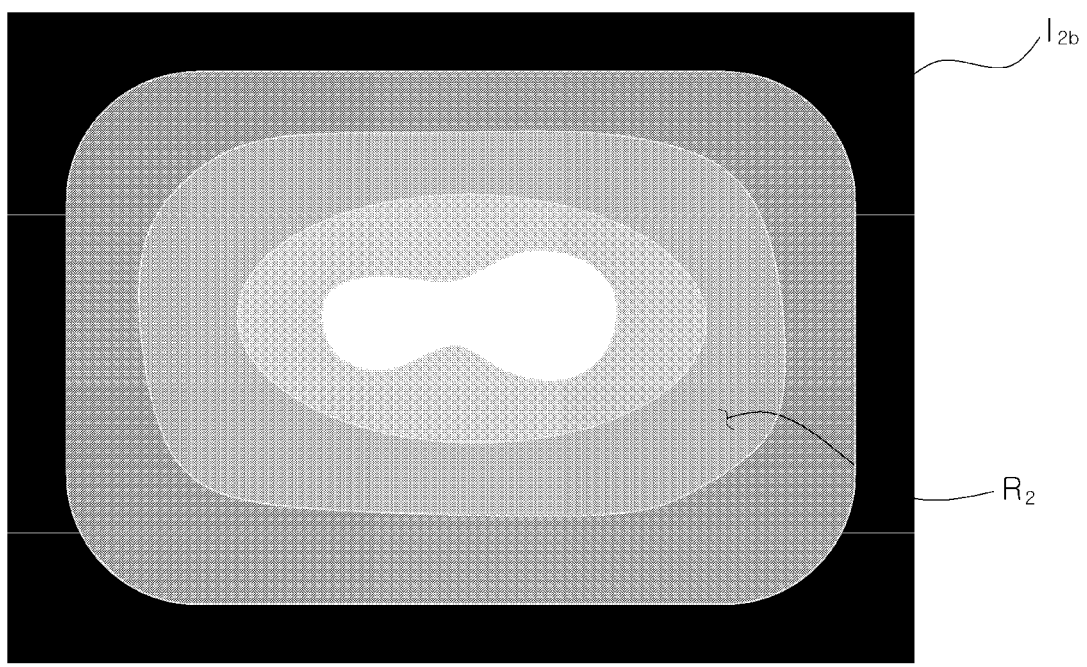
Figure 25:
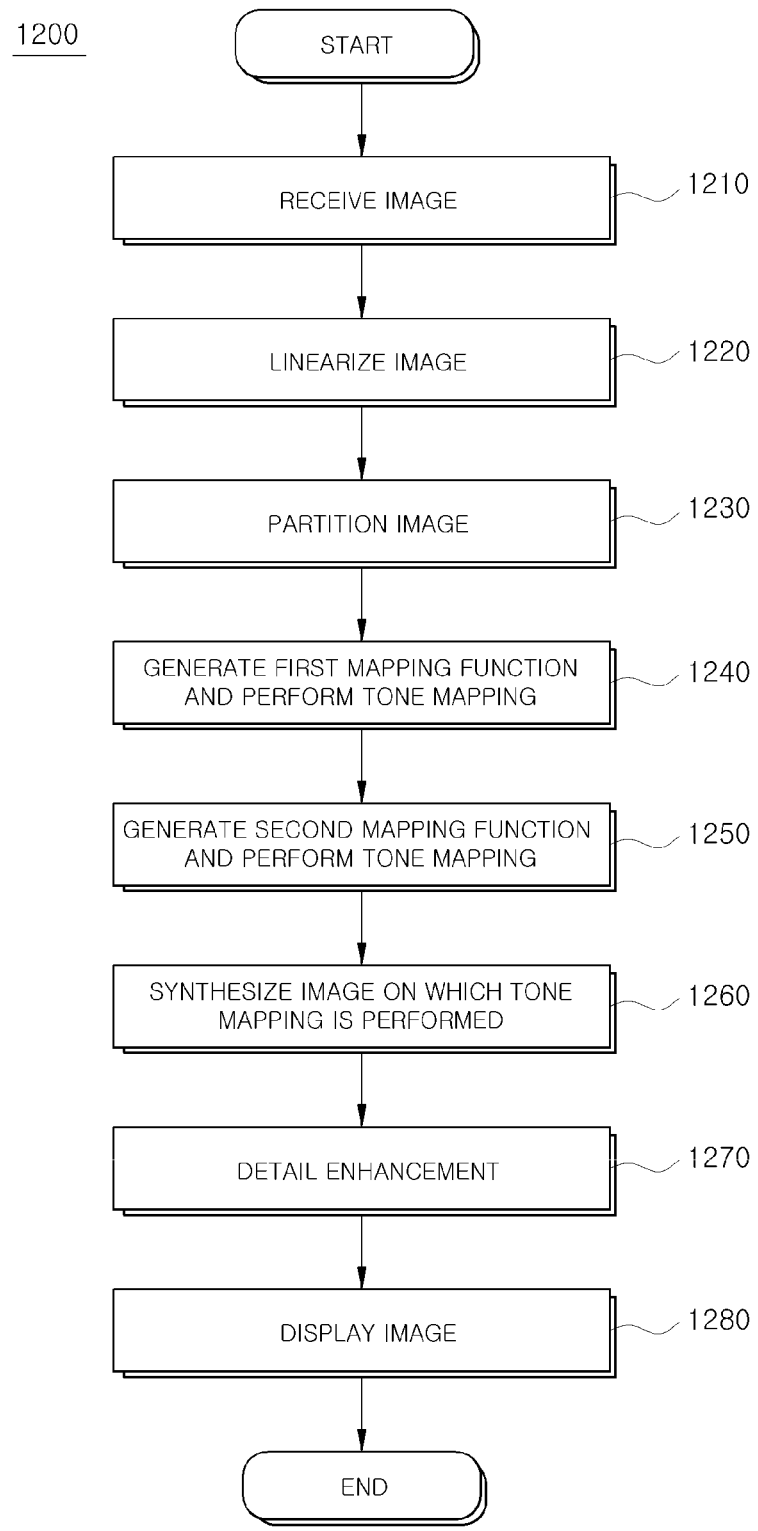
FIG. 25 illustrates another exemplary high dynamic range image display operation of a display device according to an embodiment.

For example, when tone mapping is performed on the image of the second region $R_2$ illustrated in FIG. 8 using the second mapping function $MF_2$ illustrated in FIG. 24A, the second tone mapping module 242 may generate the second region display image $I_{2b}$ as illustrated in FIG. 24B.

The image synthesizing module 260 synthesizes the first region display image $I_2$, received from the first tone mapping module 241 and the second region display image $I_{2b}$ received from the second tone mapping module 242 and generates the first image $I_2$.

For example, the image synthesizing module 260 may synthesize the first region display image $I_{2a}$ and the second region display image $I_{2b}$ illustrated in FIG. 24B and generate the first image $I_2$.

In this manner, the first tone mapping module 241 may perform tone mapping using feature information of the high luminance region. The second tone mapping module 242 may perform tone mapping using brightness information of the low luminance region. Also, the image synthesizing module may synthesize the first region display image $I_{2a}$ output from the first tone mapping module 241 and the second region display image $I_{2b}$ output from the second tone mapping module 242.

The detail enhancement module 250 processes the image 12 on which tone mapping is performed in order to provide a further vivid image for the user. Here, detail enhancement may include various image processing techniques such as contrast enhancement through which a difference between a bright region and a dark region of an image is maximized, histogram equalization through which a histogram is regulated to change an image having a low contrast distribution to an image having a uniform contrast distribution, image sharpening through which an image is finely converted, and image smoothing through which an image is gently converted.

Hereinafter, operations of the display device 100 according to an embodiment will be described.

FIG. 25 illustrates another exemplary high dynamic range image display operation of a display device according to an embodiment.

As illustrated in FIG. 25, the high dynamic range image display operation (1200) of the display device 100 will be described.

The display device 100 receives an image from the outside (1210). The display device 100 may receive content from the outside through the content receiving unit 130 and extract the image data ID and the metadata MD included in the received content.

The metadata MD is data including information on the image data ID, and may include luminance information of units of scenes or luminance information of units of frames. Specifically, the metadata MD may include a maximum luminance value, a minimum luminance value and an average luminance value of the entire content C, a maximum luminance value, a minimum luminance value and an average luminance value of an image included in each scene or a maximum luminance value, a minimum luminance value and an average luminance value of an image forming each frame.

The image data ID and the metadata MD are extracted, and then the display device 100 linearizes the received image (1120). The display device 100 may linearize image data in order to obtain the original image $I_1$.

Specifically, the image processing unit 200 of the display device 100 may use the second non-linear mapping function $F_2$ and restore the image data to the original image $I_1$. Also, the image processing unit 200 may calculate the luminance information of the original image $I_1$ based on a color value of each of the pixels included in the restored original image $I_1$.

The image is linearized and then the display device 100 partitions the original image $I_1$ into a plurality of regions (1230). The display device 100 may partition the original image $I_1$ into the first region $R_1$, which is a high luminance region, and the second region $R_2$, which is a low luminance region.

Specifically, the image processing unit 200 of the display device 100 may partition the original image $I_1$ into the first region $R_1$ including a pixel whose luminance value is equal to or greater than the reference luminance value m and the second region $R_2$ including a pixel whose luminance value is less than the reference luminance value m.

After the image is partitioned, the display device 100 generates the first mapping function $MF_1$ and performs tone mapping on the image of the first region $R_1$ (1240).

The display device 100 may generate the first mapping function $MF_1$ of the image of the first region $R_1$. Specifically, the image processing unit 200 of the display device 100 may extract a pixel including feature information such as an edge, a texture and a gradation from the image of the first region $R_1$ and generate the first mapping function $MF_1$ based on a histogram related to the pixel including feature information.

Also, the display device 100 may perform tone mapping on the image of the first region $R_1$. Specifically, the image processing unit 200 of the display device 100 may use the first mapping function $MF_1$, perform tone mapping on the image of the first region $R_1$, and generate the first region display image $I_{2a}$.

Also, the display device 100 generates the second mapping function $MF_2$ and performs tone mapping on the image of the second region $R_2$ (1250).

The display device 100 may generate the second mapping function $MF_2$ of the image of the second region $R_2$. Specifically, the image processing unit 200 of the display device 100 may generate the second mapping function $MF_2$ based on a luminance histogram of the second region $R_2$.

Also, the display device 100 may perform tone mapping on the image of the second region $R_2$. Specifically, the image processing unit 200 of the display device 100 may use the second mapping function $MF_2$, perform tone mapping on the image of the second region $R_2$, and generate the second region display image $I_{2b}$.

The tone mapping is performed and then the display device 100 synthesizes the image on which tone mapping is performed (1260). Specifically, the image processing unit 200 of the display device 100 may synthesize the first region display image $I_2a$ and the second region display image $I_{2b}$ and generate the first image $I_2$.

Then, the display device 100 performs detail enhancement on the first image $I_2$ (1270). The display device 100 may perform image processing such as contrast enhancement on the first image $I_2$ in order to further vividly display the first image $I_2$.

Specifically, the image processing unit 200 of the display device 100 may perform detail enhancement such as contrast enhancement on the first image $I_2$ and thus generate the second image $I_3$.

The detail enhancement is performed and then the display device 100 displays the image (1280). The display device 100 may display the second image $I_3$ through the display unit 140.

In this manner, the display device 100 may partition the original image $I_1$ into the first region $R_1$, which is a high luminance region, and the second region $R_2$, which is a low luminance region, perform tone mapping based on characteristics of the image such as an edge, a texture or a gradation of the image on the first region $R_1$, and perform tone mapping on the second region $R_2$ based on brightness of the image.

As a result, the display device 100 may process the original image $I_1$ such that the original image $I_1$, which is the high dynamic range image, is vividly displayed on the display panel 143 having a low dynamic range.

Figure 26:
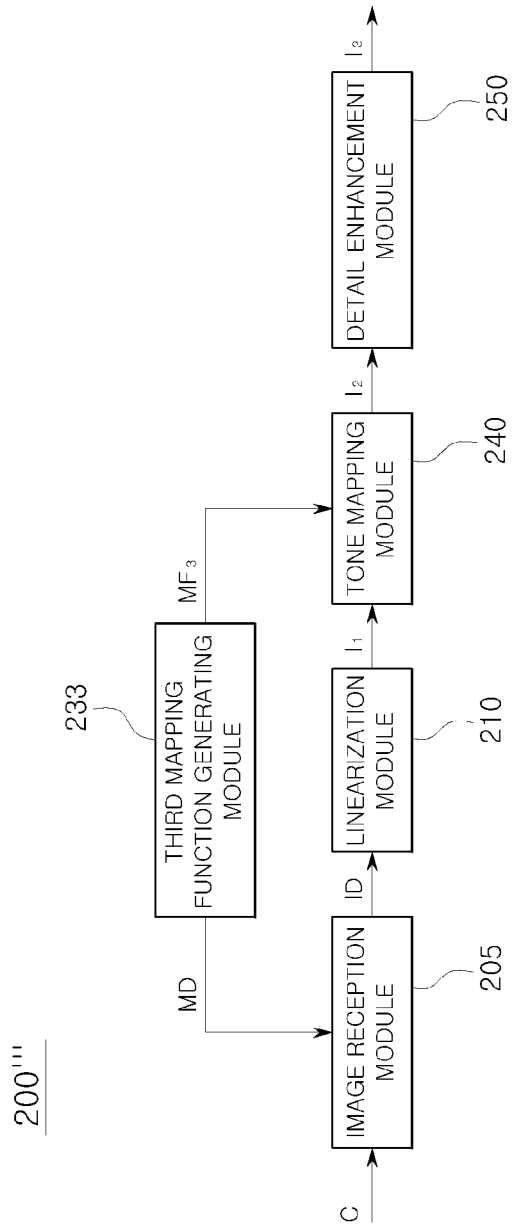
FIG. 26 illustrates another exemplary image processing unit included in a display device according to an embodiment.
Figure 27:
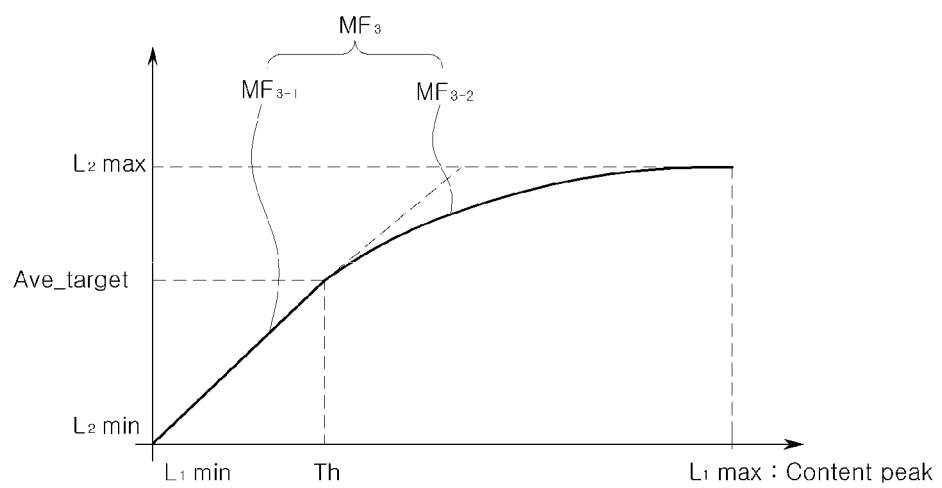
FIG. 27 illustrates a third mapping function generated by the image processing unit illustrated in FIG. 26.

FIG. 26 illustrates another exemplary image processing unit included in a display device according to an embodiment. FIG. 27 illustrates a third mapping function generated by the image processing unit illustrated in FIG. 26.

As illustrated in FIGS. 26 and 27, an image processing unit 200''' may include the image reception module 205 configured to receive the image data ID and the metadata MD, the linearization module 210 configured to linearize the image data, a third mapping function generating module 233 configured to generate a tone mapping function of the high dynamic range image, the tone mapping module 240 configured to perform tone mapping, and the detail enhancement module 250 configured to perform a post-processing operation on the image on which tone mapping is performed.

The image reception module 205 extracts the image data ID and the metadata MD from the content C received by the content receiving unit 130. Here, the content C includes the image data ID representing the original image and the metadata MD related to the image data ID. The metadata MD may include luminance information of the image data ID. When the content C is, for example, a video, the metadata MD may include at least one of luminance information of the entire content C, luminance information of each scene included in the content C, and luminance information of each frame included in the content C.

The linearization module 210 may linearize the image data ID received from the image reception module 205 and analyze a luminance of the linearized image. Specifically, when the metadata MD of the content C does not include the maximum luminance value $L_1max$ and the minimum luminance value $L_1min$, the linearization module 210 may directly calculate the maximum luminance value $L_1max$ and the minimum luminance value $L_1min$ from the linearized original image.

The third mapping function generating module 233 receives the metadata MD from the image reception module 205 and generates a third mapping function $MF_3$ based on the received metadata MD. Here, the metadata MD may include luminance information of the entire content C, that is, the maximum luminance value $L_1max$ and the minimum luminance value $L_1min$ of the entire content C.

Also, the third mapping function $MF_3$ may be defined between the maximum luminance value $L_1max$ and the minimum luminance value $L_1min$ of the content C. In other words, a maximum value input to the third mapping function $MF_3$ is the maximum luminance value $L_1max$ of the content C and a minimum value input to the third mapping function $MF_3$ is the minimum luminance value $L_1min$ of the content C.

In this manner, by the third mapping function $MF_3$ generated based on the luminance information of the entire content C, tone mapping may be performed on the original image $I_1$ included in the entire content C. In other words, even if the frame or the scene is changed, when the content C is not changed, the third mapping function $MF_3$ is not changed.

The original image $I_1$ may be classified as a low luminance part or a high luminance part based on a third reference luminance value Th. The low luminance part and the high luminance part may be differently mapped by the third mapping function $MF_3$. In other words, a mapping function of mapping the low luminance part and a mapping function of mapping the high luminance part may be different from each other.

In this case, the third reference luminance value Th of the original image $I_1$ may correspond to a target average luminance value Ave_target of a first image $I_2$. In other words, the third reference luminance value Th is mapped to the target average luminance value Ave_target. The average luminance value refers to an average of luminance values output from all pixels included in the display panel 143. The target average luminance value Ave_target is a target value of the average luminance value. Such a target average luminance value Ave_target may be defined in advance according to a type and performance of the display panel 143.

In particular, the third reference luminance value Th of the original image $I_1$ may be the same as a predetermined target average luminance value Ave_target of the first image $I_2$.

The third mapping function $MF_3$ may include a mapping function $MF_{3-1}$ of the low luminance part and a mapping function $MF_{3-2}$ of the high luminance part.

The low luminance part whose luminance value is less than the third reference luminance value Th may be linearly mapped as illustrated in FIG. 27. In particular, when the third reference luminance value Th is the same as the target average luminance value Ave_target, a luminance value of the low luminance part of the original image $I_1$ is the same as a luminance value of the low luminance part of the first image $I_2$.

Specifically, the low luminance part may be mapped by Equation 2.

$$L_2 = G_1 L_1 \quad \text{[Equation 2]}$$

(where, $L_1$ denotes a luminance value input to a third mapping function, $L_2$ denotes a luminance value output from the third mapping function, and $G_1$ denotes a constant)

In Equation 2, a value of $G_1$ may be changed according to the third reference luminance value Th and the target average luminance value Ave_target. Specifically, $G_1$ is determined such that the third reference luminance value Th is mapped to the target average luminance value Ave_target.

In particular, when the third reference luminance value Th is the same as the target average luminance value Ave_target, $G_1$ has a value of "1."

The high luminance part whose luminance value is greater than the third reference luminance value Th may be nonlinearly mapped, as illustrated in FIG. 27.

In order to map the high luminance part, Equation 3 may be used.

$$L_2 = a[1-(L_1-1)^{2n}]+(1-a)L_1 \quad \text{[Equation 3]}$$

(where, $L_1$ denotes a luminance value input to a third mapping function, $L_2$ denotes a luminance value output from the third mapping function, and a and n denote a constant.)

In Equation 3, a value of "n" may be determined in advance, and a value of a may be changed according to the maximum luminance value $L_1$max and the minimum luminance value $L_1$min of the original image $I_1$ included in the entire content C.

The tone mapping module 240 uses the third mapping function $MF_3$ and performs tone mapping on the original image $I_1$.

Specifically, luminance values of all pixels included in the original image $I_1$ are input to the third mapping function $MF_3$, and the first image $I_2$ is generated based on the luminance value output from the third mapping function $MF_3$. In this case, a pixel whose luminance value is less than the third reference luminance value Th may be mapped by Equation 2, and a pixel whose luminance value is equal to or greater than the third reference luminance value Th may be mapped by Equation 3.

The detail enhancement module 250 processes the image $I_2$ on which tone mapping is performed in order to provide a further vivid image for the user. Here, detail enhancement may include various image processing techniques such as contrast enhancement through which a difference between a bright region and a dark region of an image is maximized, histogram equalization through which a histogram is regulated to change an image having a low contrast distribution to an image having a uniform contrast distribution, image sharpening through which an image is finely converted, and image smoothing through which an image is gently converted.

Hereinafter, operations of the display device 100 according to an embodiment will be described.

Figure 28:
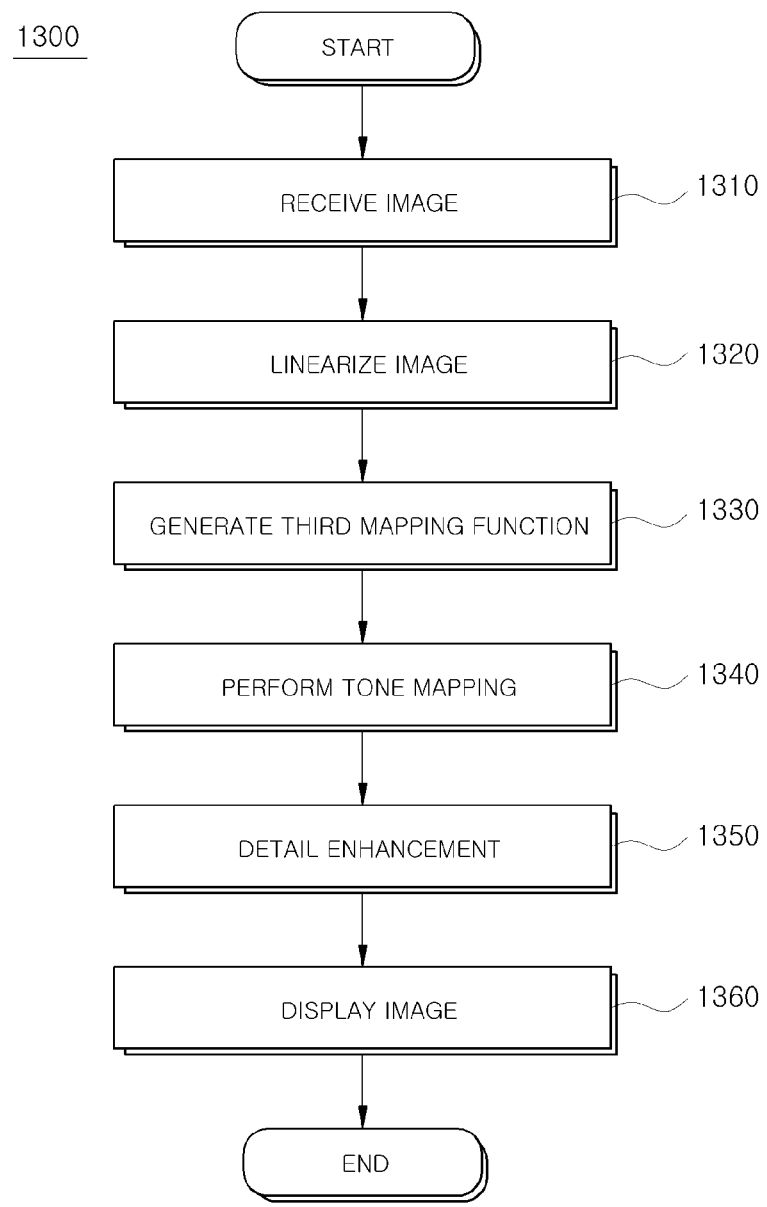
FIG. 28 illustrates another exemplary high dynamic range image display operation of a display device according to an embodiment.

FIG. 28 illustrates another exemplary high dynamic range image display operation of a display device according to an embodiment.

As illustrated in FIG. 28, the high dynamic range image display operation (1300) of the display device 100 will be described.

The display device 100 receives an image from the outside (1310). The display device 100 may receive content from the outside through the content receiving unit 130 and extract the image data ID and the metadata MD included in the received content.

The metadata MD is data including information on the image data ID, and may include luminance information of units of scenes or luminance information of units of frames. Specifically, the metadata MD may include a maximum luminance value, a minimum luminance value and an average luminance value of the entire content C, a maximum luminance value, a minimum luminance value and an average luminance value of an image included in each scene or a maximum luminance value, a minimum luminance value and an average luminance value of an image forming each frame.

The image data ID and the metadata MD are extracted, and then the display device 100 linearizes the received image (1320). The display device 100 may linearize image data in order to obtain the original image $I_1$.

Specifically, the image processing unit 200 of the display device 100 may use the second non-linear mapping function $F_2$ and restore the image data to the original image $I_1$. Also, the image processing unit 200 may calculate the luminance information of the original image $I_1$ based on a color value of each of the pixels included in the restored original image $I_1$.

The image is linearized and then the display device 100 generates the third mapping function $MF_3$ (1330). The display device 100 may generate the third mapping function $MF_3$ based on the metadata MD. Specifically, the display device 100 may generate the third mapping function $MF_3$ based on the maximum luminance value $L_1$max and the minimum luminance value $L_1$min of the entire content C.

When a luminance value of a pixel included in the original image $I_1$ is less than the third reference luminance value, the third mapping function $MF_3$ is Equation 2. When a luminance value of a pixel included in the original image $I_1$ is equal to or greater than the third reference luminance value, the third mapping function $MF_3$ is Equation 3.

The third mapping function $MF_3$ is generated and then the display device 100 performs tone mapping on the original image $I_1$ (1340).

Specifically, the display device 100 inputs luminance values of all pixels included in the original image $I_1$ to the third mapping function $MF_3$ and generates the first image $I_2$ based on the luminance value output from the third mapping function $MF_3$. In this case, when the luminance value is less than the third reference luminance value, the pixel included in the original image $I_1$ may be mapped by Equation 2. When the luminance value is equal to or greater than the third reference luminance value, the pixel included in the original image $I_1$ may be mapped by Equation 3.

The tone mapping is performed and then the display device 100 performs detail enhancement on the first image $I_2$ (1350). The display device 100 may perform image processing such as contrast enhancement on the first image $I_2$ in order to further vividly display the first image $I_2$.

Specifically, the image processing unit 200 of the display device 100 may perform detail enhancement such as contrast enhancement on the first image $I_2$ and thus generate the second image $I_3$.

The detail enhancement is performed and then the display device 100 displays the image (1360). The display device 100 may display the second image $I_3$ through the display unit 140.

In this manner, the display device 100 may perform linear tone mapping on the low luminance region of the original image $I_1$ and nonlinear tone mapping on the high luminance region.

Figure 29:
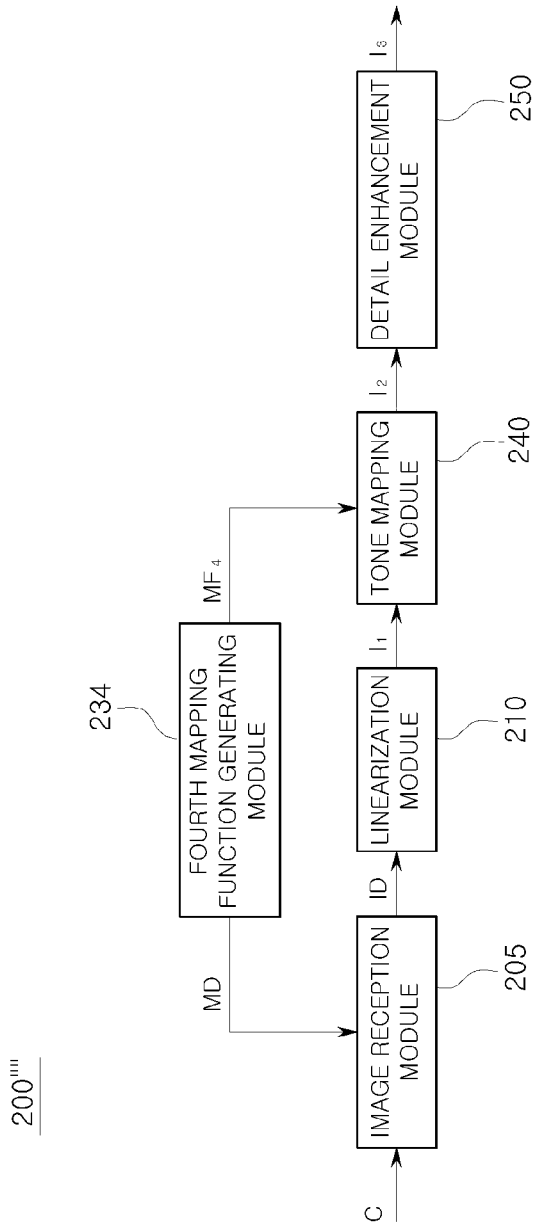
FIG. 29 illustrates another exemplary image processing unit included in a display device according to an embodiment.
Figure 30:
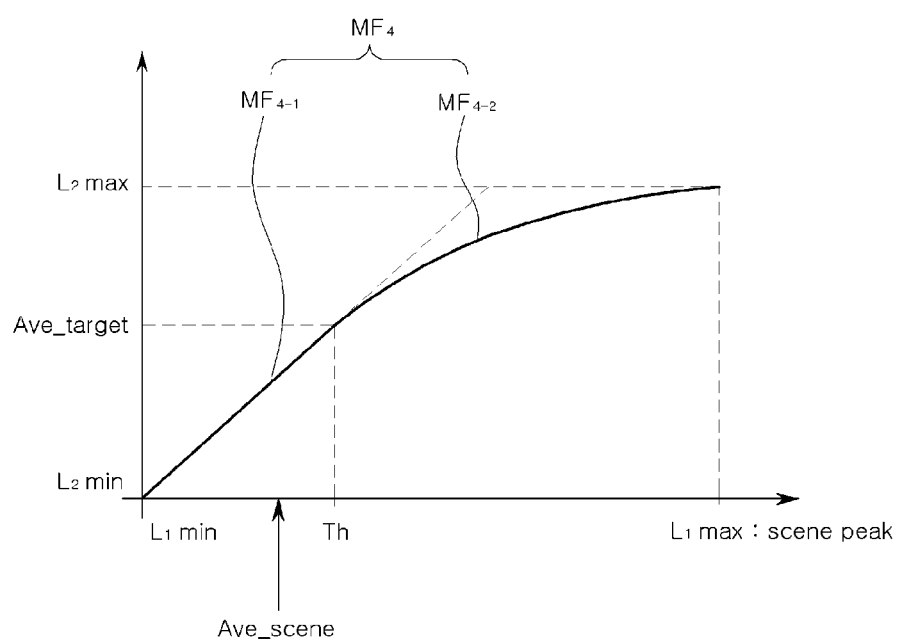
FIGS. 30 and 31 illustrate a fourth mapping function generated by the image processing unit illustrated in FIG. 29.
Figure 31:
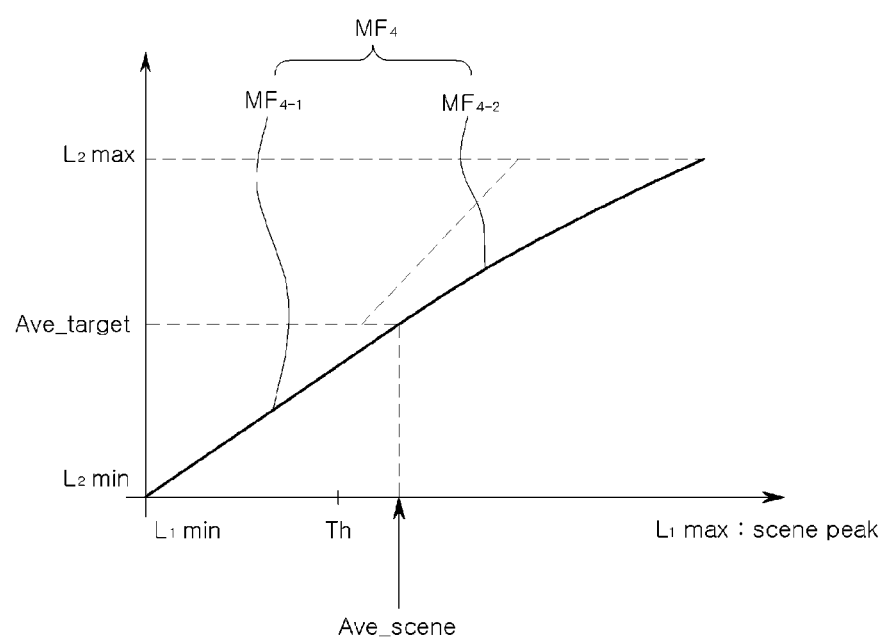

FIG. 29 illustrates another exemplary image processing unit included in a display device according to an embodiment. FIGS. 30 and 31 illustrate a fourth mapping function generated by the image processing unit illustrated in FIG. 29

As illustrated in FIGS. 29, 30 and 31, the image processing unit 200"" may include the image reception module 205 configured to receive the image data ID and the metadata MD, the linearization module 210 configured to linearize the image data, a fourth mapping function generating module 234 configured to generate a tone mapping function of the high dynamic range image, the tone mapping module 240 configured to perform tone mapping, and the detail enhancement module 250 configured to perform a post-processing operation on the image on which tone mapping is performed.

The image reception module 205 extracts the image data ID and the metadata MD from the content C received by the content receiving unit 130. Here, the content C includes the image data ID representing the original image and the metadata MD related to the image data ID. The metadata MD may include luminance information of the image data ID. When the content C is, for example, a video, the metadata MD may include at least one of luminance information of the entire content C, luminance information of each scene included in the content C, and luminance information of each frame included in the content C.

The linearization module 210 may linearize the image data ID received from the image reception module 205 and analyze a luminance of the linearized image. Specifically, when the metadata MD of the content C does not include the maximum luminance value $L_1$max and the minimum luminance value $L_1$min, the linearization module 210 may directly calculate the maximum luminance value $L_1$max and the minimum luminance value $L_1$min from the linearized original image.

The fourth mapping function generating module 234 receives the metadata MD from the image reception module 205 and generates a fourth mapping function $MF_4$ based on the received metadata MD. Here, the metadata MD may include luminance information of each scene included in the content C, that is, the maximum luminance value $L_1$max and the minimum luminance value $L_1$min of each scene.

Also, the fourth mapping function $MF_4$ may be defined between the maximum luminance value $L_1$max and the minimum luminance value $L_1$min of each scene. In other words, a maximum value input to the fourth mapping function $MF_4$ is the maximum luminance value $L_1$max of a corresponding scene and a minimum value input to the fourth mapping function $MF_4$ is the minimum luminance value $L_1$min of the corresponding scene.

In this manner, by the third mapping function $MF_3$ generated based on the luminance information of the scene, tone mapping may be performed on the original image $I_1$ included in the corresponding scene. In other words, even if the frame is changed, when the scene is not changed, the fourth mapping function $MF_4$ is not changed. However, even if the content C is not changed, when the scene is changed, the fourth mapping function $MF_4$ is changed.

The fourth mapping function $MF_4$ may be changed according to a scene average luminance value Ave_scene indicating an average luminance value of the entire scene. Also, the original image $I_1$ may be classified as a low luminance part or a high luminance part. The low luminance part and the high luminance part may be differently mapped by the fourth mapping function $MF_4$. In other words, a mapping function of mapping the low luminance part and a mapping function of mapping the high luminance part may be different from each other.

First, the fourth mapping function $MF_4$ when the scene average luminance value Ave_scene is less than a fourth reference luminance value Th will be described.

The fourth mapping function $MF_4$ may include a mapping function $MF_{4-1}$ of the low luminance part of the original image $I_1$ and a mapping function $MF_{4-2}$ of the high luminance part of the original image $I_1$.

In this case, the low luminance part and the high luminance part of the original image $I_1$ may be divided based on the fourth reference luminance value Th. Also, the fourth reference luminance value Th of the original image $I_1$ may correspond to the target average luminance value Ave_target of the first image $I_2$. In other words, the fourth reference luminance value Th is mapped to the target average luminance value Ave_target. The average luminance value refers to an average of luminance values output from all pixels included in the display panel 143. The target average luminance value Ave_target is a target value of the average luminance value. Such a target average luminance value Ave_target may be defined in advance according to a type and performance of the display panel 143. In particular, the fourth reference luminance value Th of the original image $I_1$ may be the same as a predetermined target average luminance value Ave_target of the first image $I_2$.

The low luminance part whose luminance value is less than the fourth reference luminance value Th may be linearly mapped as illustrated in FIG. 30. In particular, when the fourth reference luminance value Th is the same as the target average luminance value Ave_target, the luminance value of the low luminance part of the original image $I_1$ is the same as the luminance value of the low luminance part of the first image $I_2$.

Specifically, the low luminance part may be mapped by Equation 2.

$$L_2 = G_1 L_1 \qquad \text{[Equation 2]}$$

(where, $L_1$ denotes a luminance value input to a fourth mapping function, $L_2$ denotes a luminance value output from the fourth mapping function and $G_1$ is a constant.)

In Equation 2, a value of $G_1$ may be changed according to the fourth reference luminance value Th and the target average luminance value Ave_target. Specifically, $G_1$ is determined such that the fourth reference luminance value Th is mapped to the target average luminance value Ave_target.

In particular, when the fourth reference luminance value Th is the same as the target average luminance value Ave_target, $G_1$ has a value of "1."

The high luminance part whose luminance value is equal to or greater than the fourth reference luminance value Th may be nonlinearly mapped as illustrated in FIG. 30.

The high luminance part may be mapped by Equation 3.

In this manner, when the scene average luminance value Ave_scene is less than the fourth reference luminance value Th, the fourth mapping function $MF_4$ generated by the fourth mapping function generating module 234 is Equation 2 when the luminance value of the pixel included in the original image $I_1$ is less than the fourth reference luminance value Th, or is Equation 3 when the luminance value of the pixel included in the original image $I_1$ is equal to or greater than the fourth reference luminance value Th.

Next, the fourth mapping function $MF_4$ when the scene average luminance value Ave_scene is equal to or greater than the fourth reference luminance value Th will be described.

The fourth mapping function $MF_4$ may include the mapping function $MF_{4-1}$ of the low luminance part of the original image $I_1$ and the mapping function $MF_{4-2}$ of the high luminance part of the original image $I_1$.

In this case, the low luminance part and the high luminance part of the original image $I_1$ are divided based on the scene average luminance value Ave_scene. Also, the scene average luminance value Ave_scene of the original image $I_1$ may correspond to the target average luminance value Ave_target of the first image $I_2$. In other words, the scene average luminance value Ave_scene is mapped to the target average luminance value Ave_target. The average luminance value refers to an average of luminance values output from all pixels included in the display panel 143. The target average luminance value Ave_target is a target value of the average luminance value. Such a target average luminance value Ave_target may be defined in advance according to a type and performance of the display panel 143.

The low luminance part whose luminance value is less than the scene average luminance value Ave_scene may be linearly mapped as illustrated in FIG. 31.

Specifically, the low luminance part may be mapped by Equation 5.

$$L_2 = G_2 L_1 \qquad \text{[Equation 5]}$$

(where, $L_1$ denotes a luminance value input to a fourth mapping function, $L_2$ denotes a luminance value output from the fourth mapping function, and $G_2$ is a constant.)

In Equation 5, a value of $G_2$ may be changed according to the scene average luminance value Ave_scene and the target average luminance value Ave_target. Specifically, $G_2$ is determined such that the scene average luminance value Ave_scene is mapped to the target average luminance value Ave_target.

In particular, when the scene is changed, since the scene average luminance value Ave_scene is changed, $G_2$ may be changed whenever the scene is changed.

The high luminance part whose luminance value is equal to or greater than the scene average luminance value Ave_scene may be nonlinearly mapped as illustrated in FIG. 31.

The high luminance part may be mapped by Equation 6.

$$L_2 = a[1-(L_1-1)^{2n}] + (1-a)L_1 \quad \text{[Equation 6]}$$

(where, $L_1$ denotes a luminance value input to a fourth mapping function, Ave_target denotes a target average luminance value, $L_2$ denotes a luminance value output from the fourth mapping function, Ave_scene denotes a scene average luminance value, and a and n are constants.)

In Equation 6, a value of n may be determined in advance, and a value of a may be determined according to the maximum luminance value $L_1$max and the minimum luminance value $L_1$min of the original image $I_1$ included in each scene.

In this manner, when the scene average luminance value Ave_scene is equal to or greater than the fourth reference luminance value Th, the fourth mapping function $MF_4$ generated by the fourth mapping function generating module 234 is Equation 5 when the luminance value of the pixel included in the original image $I_1$ is less than the scene average luminance value Ave_scene, or is Equation 6 when the luminance value of the pixel included in the original image $I_1$ is equal to or greater than the scene average luminance value Ave_scene.

The tone mapping module 240 performs tone mapping on the original image $I_1$ using the fourth mapping function $MF_4$.

Specifically, the tone mapping module 240 inputs luminance values of all pixels included in the original image $I_1$ to the fourth mapping function $MF_4$ and generates the first image $I_2$ based on the luminance value output from the fourth mapping function $MF_4$.

In this case, when the scene average luminance value Ave_scene is less than the fourth reference luminance value Th, a pixel whose luminance value is less than the third reference luminance value Th may be mapped by Equation 2, and a pixel whose luminance value is equal to or greater than the third reference luminance value Th may be mapped by Equation 3.

Also, when the scene average luminance value Ave_scene is equal to or greater than the fourth reference luminance value Th, a pixel whose luminance value is less than the scene average luminance value Ave_scene may be mapped by Equation 5, and a pixel whose luminance value is equal to or greater than the scene average luminance value Ave_scene may be mapped by Equation 6.

The detail enhancement module 250 processes the image $I_2$ on which tone mapping is performed in order to provide a further vivid image for the user. Here, detail enhancement may include various image processing techniques such as contrast enhancement through which a difference between a bright region and a dark region of an image is maximized, histogram equalization through which a histogram is regulated to change an image having a low contrast distribution to an image having a uniform contrast distribution, image sharpening through which an image is finely converted, and image smoothing through which an image is gently converted.

Hereinafter, operations of the display device 100 according to an embodiment will be described.

Figure 32:
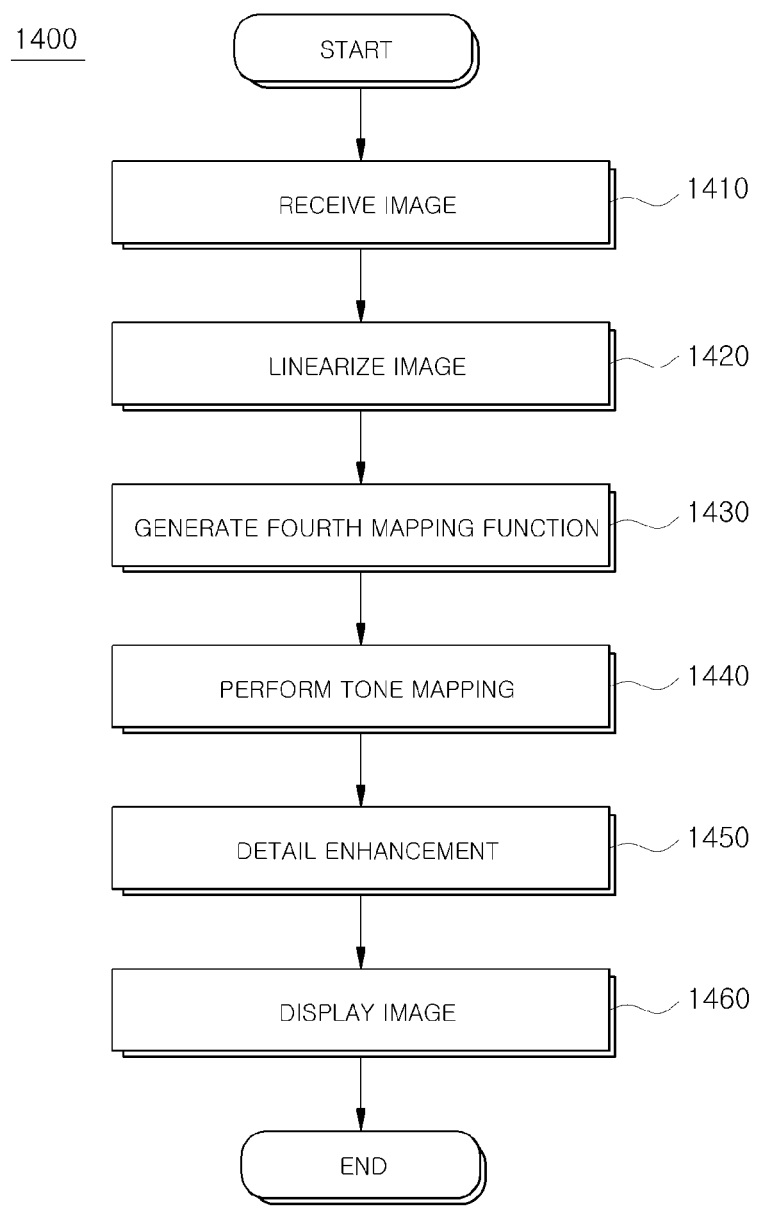
FIG. 32 illustrates another exemplary high dynamic range image display operation of a display device according to an embodiment.

FIG. 32 illustrates another exemplary high dynamic range image display operation of a display device according to an embodiment.

As illustrated in FIG. 32, the high dynamic range image display operation (1400) of the display device 100 will be described.

The display device 100 receives an image from the outside (1210). The display device 100 may receive content from the outside through the content receiving unit 130 and extract the image data ID and the metadata MD included in the received content.

The metadata MD is data including information on the image data ID, and may include luminance information of units of scenes or luminance information of units of frames. Specifically, the metadata MD may include a maximum luminance value, a minimum luminance value and an average luminance value of the entire content C, a maximum luminance value, a minimum luminance value and an average luminance value of an image included in each scene or a maximum luminance value, a minimum luminance value and an average luminance value of an image forming each frame.

The image data ID and the metadata MD are extracted, and then the display device 100 linearizes the received image (1420). The display device 100 may linearize image data in order to obtain the original image $I_1$.

Specifically, the image processing unit 200 of the display device 100 may use the second non-linear mapping function $F_2$ and restore the image data to the original image $I_1$. Also, the image processing unit 200 may calculate the luminance information of the original image $I_1$ based on a color value of each of the pixels included in the restored original image $I_1$.

The image is linearized and then the display device 100 generates the fourth mapping function $MF_4$ (1330). The display device 100 may generate the fourth mapping function $MF_4$ based on the metadata MD. Specifically, the display device 100 may generate the fourth mapping function $MF_4$ based on the maximum luminance value $L_1$max, the minimum luminance value $L_1$min and the scene average luminance value Ave_scene of each scene.

Specifically, when the scene average luminance value Ave_scene is less than the fourth reference luminance value Th, the fourth mapping function $MF_4$ is Equation 2 when the luminance value of the pixel included in the original image $I_1$ is less than the fourth reference luminance value Th, or is Equation 3 when the luminance value of the pixel included in the original image $I_1$ is equal to or greater than the fourth reference luminance value Th.

When the scene average luminance value Ave_scene is equal to or greater than the fourth reference luminance value Th, the fourth mapping function $MF_4$ is Equation 5 when the luminance value of the pixel included in the original image $I_1$ is less than the scene average luminance value Ave_scene, or is Equation 6 when the luminance value of the pixel included in the original image $I_1$ is equal to or greater than the scene average luminance value Ave_scene.

The fourth mapping function $MF_4$ is generated and then the display device 100 performs tone mapping on the original image $I_1$ (1440).

Specifically, the display device 100 inputs luminance values of all pixels included in the original image $I_1$ to the fourth mapping function $MF_4$ and generates the first image $I_2$ based on the luminance value output from the fourth mapping function $MF_4$.

In this case, when the scene average luminance value Ave_scene is less than the fourth reference luminance value Th, a pixel whose luminance value is less than the third reference luminance value Th may be mapped by Equation 2, and a pixel whose luminance value is equal to or greater than the third reference luminance value Th may be mapped by Equation 3.

Also, when the scene average luminance value Ave_scene is equal to or greater than the fourth reference luminance value Th, a pixel whose luminance value is less than the scene average luminance value Ave_scene may be mapped by Equation 5, and a pixel whose luminance value is equal to or greater than the scene average luminance value Ave_scene may be mapped by Equation 6.

The tone mapping is performed and then the display device 100 performs detail enhancement on the first image $I_2$ (1450). The display device 100 may perform image processing such as contrast enhancement on the first image $I_2$ in order to further vividly display the first image $I_2$.

Specifically, the image processing unit 200 of the display device 100 may perform detail enhancement such as contrast enhancement on the first image $I_2$ and thus generate the second image $I_3$.

The detail enhancement is performed and then the display device 100 displays the image (1460). The display device 100 may display the second image $I_3$ through the display unit 140.

In this manner, the display device 100 may perform linear tone mapping on the low luminance region of the original image $I_1$ and nonlinear tone mapping on the high luminance region.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A display device, comprising:
    a content receiver configured to receive a high dynamic range image and luminance information of the high dynamic range image;
    an image processor configured to perform tone mapping by partitioning the high dynamic range image into a plurality of regions to convert the high dynamic range image into a low dynamic range image, the tone mapping being respectively performed in association with the plurality of regions based on the luminance information including an image maximum luminance value and an image minimum luminance value of the high dynamic range image; and
    a display configured to display the low dynamic range image,
    wherein the tone mapping includes:
        a first tone mapping for a first region among the plurality of regions which has a first luminance value greater than or equal to a reference luminance value for the high dynamic range image, and
        a second tone mapping for a second region among the plurality of regions which has a second luminance value less than or equal to the reference luminance value for the high dynamic range image, and
    wherein the reference luminance value is based on an average of luminance values obtained from the luminance information of the high dynamic range image.

2. The display device according to claim 1, wherein the luminance information includes a scene maximum luminance value and a scene minimum luminance value of the high dynamic range image included in a scene.

3. The display device according to claim 1, wherein the luminance information includes a frame maximum luminance value and a frame minimum luminance value of the high dynamic range image included in a frame.

4. The display device according to claim 1, wherein the luminance information includes a content maximum luminance value and a content minimum luminance value of the high dynamic range image included in an entire content.

5. The display device according to claim 1, wherein the tone mapping performed by the image processor is one of a linear tone mapping on a first pixel whose luminance value is less than a reference luminance value among a plurality of pixels included in the high dynamic range image, and a nonlinear tone mapping on a second pixel whose luminance value is greater than or equal to the reference luminance value among the plurality of pixels.

6. The display device according to claim 1, wherein, when a scene average luminance value of the high dynamic range image included in a scene is less than a reference luminance value, and
    the tone mapping performed by the image processor is one of a linear tone mapping on a first pixel whose luminance value is less than the reference luminance value among a plurality of pixels included in the high dynamic range image and a nonlinear tone mapping on a second pixel whose luminance value is greater than or equal to the reference luminance value among the plurality of pixels.

7. The display device according to claim 1, wherein, when a scene average luminance value of the high dynamic range image included in a scene is greater than or equal to a reference luminance value,
    the tone mapping performed by the image processor is one of a linear tone mapping on a first pixel whose luminance value is less than the scene average luminance value among a plurality of pixels included in the high dynamic range image and a nonlinear tone mapping on a second pixel whose luminance value is greater than or equal to the scene average luminance value among the plurality of pixels.

8. A display device, comprising:
    a content receiver configured to receive a high dynamic range image and luminance information of the high dynamic range image;
    an image processor configured to perform tone mapping by partitioning the high dynamic range image into a plurality of regions to convert the high dynamic range image into a low dynamic range image to convert the high dynamic range image into a low dynamic range image, the tone mapping being performed based on the luminance information including an image maximum luminance value and an image minimum luminance value of the high dynamic range image; and
    a display configured to display the low dynamic range image,
    wherein the image processor detects a region among the plurality of regions that has a luminance value that is greater than or equal to a reference luminance value for the high dynamic range image, and performs the tone mapping on a region image of the region detected based on feature information of the region image of the region, and wherein the feature information includes a two-dimensional arrangement of a plurality of pixels in the region.

9. The display device according to claim 8, wherein the feature information includes at least one of edge information, texture information and gradation information.

10. The display device according to claim 9, wherein the image processor detects an edge region within the region image of the first region and generates a mapping function based on a histogram of pixels included in the edge region.

11. The display device according to claim 10, wherein the first mapping function is a cumulative histogram obtained by integrating a histogram of pixels included in the edge region.

12. The display device according to claim 8, wherein the region among the plurality of regions detected where the luminance value is greater than or equal to the reference luminance value is a first region, and the image processor generates a mapping function based on a luminance value of a second region among the plurality of regions that has a luminance value that is less than the reference luminance value within the high dynamic range image.

13. The display device according to claim 12, wherein the image processor generates a tone mapping function based on a mapping function based on a histogram of pixels included in an edge region within the region image of the first region and the mapping function based on the luminance value of the second region, and converts the high dynamic range image into the low dynamic range image according to the tone mapping function.

14. A method of controlling a display device, comprising:
receiving a high dynamic range image and luminance information of the high dynamic range image;
partitioning the high dynamic range image into a plurality of regions to perform tone mapping to convert the high dynamic range image into a low dynamic range image, the tone mapping being based on the luminance information including an image maximum luminance value and an image minimum luminance value of the high dynamic range image; and
displaying the low dynamic range image,
wherein the tone mapping includes:
a first tone mapping for a first region among the plurality of regions which has a first luminance value greater than or equal to a reference luminance value for the high dynamic range image, and
a second tone mapping for a second region among the plurality of regions which has a second luminance value less than or equal to the reference luminance value for the high dynamic range image, and
wherein the reference luminance value is based on an average of luminance values obtained from the luminance information of the high dynamic range image.

15. The method according to claim 14, wherein the luminance information includes a scene maximum luminance value and a scene minimum luminance value of the high dynamic range image included in a scene.

16. The method according to claim 14, wherein the luminance information includes a frame maximum luminance value and a frame minimum luminance value of the high dynamic range image forming a frame.

17. The method according to claim 14, wherein the luminance information includes a content maximum luminance value and a content minimum luminance value of the high dynamic range image included in an entire content.

18. The method according to claim 14,
wherein the performing of the tone mapping includes:
detecting a region among the plurality of regions that has a luminance value is greater than or equal to a reference luminance value for the high dynamic range image,
generating a tone mapping function based on feature information of a region image of the region; and
performing tone mapping on the high dynamic range image according to the tone mapping function to convert the high dynamic range image into the low dynamic range image, and
wherein the feature information includes at least one of edge information, texture information and gradation information of the high dynamic range image.

19. The method according to claim 14, wherein the partitioning of the high dynamic range image into the plurality of regions comprises:
spatially dividing the high dynamic range image into a first region of the plurality of regions of the high dynamic range image, the first region having a luminance higher than a second region of the plurality of regions of the high dynamic range image;
determining a first mapping function and a second mapping function corresponding to the first region and the second region, respectively, where the first mapping function enhances one or more image features and the second mapping function increases brightness; and
tone mapping the image using the first and second mapping functions responsive to luminance to preserve brightness of the image of the second region and preserve feature information of the image of the first region.

20. The method according to claim 19, further comprising:
concatenating the first mapping function and the second mapping function producing a concatenated mapping function,
wherein the tone mapping of the image includes:
mapping the high dynamic range image using the concatenated mapping function according to image luminance.

* * * * *